(12) United States Patent
Brant et al.

(10) Patent No.: US 11,912,877 B2
(45) Date of Patent: Feb. 27, 2024

(54) ALUMINUM-BASED COUPLING AGENTS

(71) Applicants: Patrick Brant, Taylor Lake Village, TX (US); Justin Smith, Houston, TX (US)

(72) Inventors: Patrick Brant, Taylor Lake Village, TX (US); Justin Smith, Houston, TX (US)

( * ) Notice: Subject to any disclaimer, the term of this patent is extended or adjusted under 35 U.S.C. 154(b) by 0 days.

(21) Appl. No.: 18/098,550

(22) Filed: Jan. 18, 2023

(65) Prior Publication Data
US 2023/0227659 A1     Jul. 20, 2023

Related U.S. Application Data

(60) Provisional application No. 63/300,506, filed on Jan. 18, 2022.

(51) Int. Cl.
| | |
|---|---|
| C08K 9/04 | (2006.01) |
| C09C 3/08 | (2006.01) |
| C09C 1/30 | (2006.01) |
| C09C 1/40 | (2006.01) |
| C09C 3/00 | (2006.01) |
| C09C 3/10 | (2006.01) |

(52) U.S. Cl.
CPC .................. C09C 3/08 (2013.01); C08K 9/04 (2013.01); C09C 1/309 (2013.01); C09C 1/3063 (2013.01); C09C 1/3072 (2013.01); C09C 1/407 (2013.01); C09C 3/006 (2013.01); C09C 3/10 (2013.01); C01P 2004/10 (2013.01); C01P 2004/20 (2013.01); C01P 2004/32 (2013.01)

(58) Field of Classification Search
CPC ......... C09C 1/306; C09C 1/307; C09C 1/407; C09C 3/006; C01P 2004/10; C01P 2004/20; C01P 2004/32; C08K 9/04
USPC ....................................................... 523/209
See application file for complete search history.

(56) References Cited

U.S. PATENT DOCUMENTS

| | | | |
|---|---|---|---|
| 4,607,019 A | 8/1986 | Best | |
| 4,739,007 A | 4/1988 | Okada et al. | |
| 2005/0053818 A1* | 3/2005 | St-Arnaud | ............ H01M 8/103 429/493 |
| 2007/0200235 A1* | 8/2007 | Ohkura | ............ H01L 21/02348 257/734 |
| 2014/0256543 A1* | 9/2014 | Khosravi-Mardkhe | ... C01F 7/36 502/439 |

FOREIGN PATENT DOCUMENTS

| | | |
|---|---|---|
| CN | 1386767 A | 12/2002 |
| CN | 106749806 A | 5/2017 |

OTHER PUBLICATIONS

Puurunen et al., "IR and NMR Study of the Chemisorption of Ammonia on Trimethylaluminum-Modified Silica", J. Phys. Chem. B 2000, 104, 6599-6609.

Zhu et al., "PMMA Nanocomposites Based on PMMA-Grafted α-Zirconium Phosphate Nanoplatelets", Macromolecules 2022, 55, 1165-1177.

Alkhodairi et al., "Compatibilizing Immiscible Polymer Blends with Sparsely Grafted Nanoparticles", Macromolecules 2020, 53, 10330-10338.

Liu et al., "The Fumed Silica Surface: A Study by NMR", J. Am. Chem. Soc. 1996, 118, 5103-5119.

Paul et al., "Polymer nanotechnology: Nanocomposites", Polymer 49 (2008) 3187-3204.

Low et al., "The reaction of ammonia with SiOSiHCl2 monolayers on silica", Journal of Catalysis vol. 71, Issue 1, Sep. 1981, pp. 144-151.

Arkles, "Silane Coupling Agents: Connecting Across Boundaries", Gelest, Inc., Version 3.0, Jan. 2014, 76 pages.

Sneh et al., "Thermal Stability of Hydroxyl Groups on a Well-Defined Silica Surface", J. Phys. Chem. 1995, 99, 4639-4647.

Phonthamachai et al., "Solvent-Free One-Pot Synthesis of high performance silica/epoxy nanocomposites", Polymer, vol. 51, Issue 23, Oct. 29, 2010, pp. 5377-5384.

Jung et al., "Synergetic effect of aramid nanofiber-graphene oxide hybrid filler on the properties of rubber compounds for tire tread application", Journal of Applied Polymer Science, 2022, vol. 139 Issue 13, 12 pages.

Yates et al., "Infrared studies of the reactions between silica and trimethylaluminum", J. Phys. Chem. Apr. 1, 1969, 73, 4, p. 911.

Low et al., "Reactive silica: XV. Some properties of solids prepared by the reaction of trimethylaluminum with silica", Journal of Catalysis, vol. 69, Issue 2, Jun. 1981, p. 384.

Puurunen et al., "Successive reactions of gaseous trimethylaluminium and ammonia on porous alumina", Phys. Chem. Chem. Phys., 2001,3, 1093-1102.

Leone et al., "In situ polymerization of ethylene using metallocene catalysts: Effect of clay pretreatment on the properties of highly filled polyethylene nanocomposites", Aug. 2008, Journal of Polymer Science Part A Polymer Chemistry 46(16):5390-5403.

Tsubokawa, "Surface Grafting of Polymers onto Nanoparticles in a Solvent-Free Dry-System and Applications of Polymer-grafted Nanoparticles as Novel Functional Hybrid Materials", Polymer Journal vol. 39, pp. 983-1000 (2007).

(Continued)

*Primary Examiner* — Hannah J Pak
(74) *Attorney, Agent, or Firm* — Frank E. Reid

(57) ABSTRACT

Compositions comprising Group 13 element-based coupling agents and/or aluminum-based substrates and methods for making such compositions are provided. Compositions herein further comprise an inorganic substrate, a functionalized polymer, or a combination thereof. Such compositions may further comprise a secondary coupling agent having two or more functional groups. Compositions comprising a particulate inorganic substrate dispersed in a polymer form composite materials having improved mechanical properties. Compositions comprising a monolithic inorganic substrate having at least one surface bonded to a polymer layer form articles having improved surface properties.

15 Claims, No Drawings

(56) References Cited

OTHER PUBLICATIONS

Tsubokawa et al., "Grafting of 'dendrimer-like' highly branched polymer onto ultrafine silica surface", Reactive and Functional Polymers, vol. 37, Issues 1-3, 1998, pp. 75-82.
D'Orsi et al., "Tailoring the Chemical Structure of Cellulose Nanocrystals by Amine Functionalization", Eur. J. Org. Chem. 2023, Feb. 2, 2023.
International Search Report and Written Opinion for related International Patent Application No. PCT/US2023/011040, dated May 9, 2023, 8 pages.
Frey et al., "Peptomer Aluminum Oxide Nanoparticle Conjugates as Systemic and Mucosal Vaccine Candidates: Synthesis and Characterization of a Conjugate Derived from the C4 Domain of HIV-1MN Gp120", Bioconjugate Chem. 1997, 8, 424-433.

* cited by examiner

ALUMINUM-BASED COUPLING AGENTS

CROSS-REFERENCE TO RELATED APPLICATIONS

This application claims priority of U.S. Provisional Patent Application Ser. No. 63/300,506, entitled "ALUMINUM-BASED COUPLING AGENTS," filed on Jan. 18, 2022, the contents of which is incorporated by reference herein in its entirety.

FIELD OF THE INVENTION

This disclosure relates to compositions containing aluminum-based coupling agents and processes for making such compositions. The aluminum-based coupling agents are useful in combinations of hard substrates and polymers.

BACKGROUND OF THE INVENTION

Heterogeneous environments wherein bulk properties of different phases are combined into a uniform composite structure are useful in many applications. Coupling agents have the ability to form a durable bond between organic and inorganic materials, such as fiber-reinforced polymers or polymer coating of metal surfaces. Silane coupling agents have been commercially successful. However, silane coupling agents are typically prepared by using the corresponding anhydrous chlorides as starting materials, which can result in corrosion concerns (not so much or at all if alkoxides or phenoxides of Si are used), potentially slow reaction rates, and high costs of production.

A lower cost, faster reacting, and broadly applicable alternative to silane coupling agents would be desirable. A valuable approach would avoid expensive starting materials and/or processes without performance tradeoffs. Ideally, improved combinations of hard substrates and polymers could be made faster and with less waste using economical starting materials, commonly-used equipment, and familiar techniques.

SUMMARY OF THE INVENTION

In general, the present disclosure relates to compositions that contain an aluminum-based coupling agent in combination with an inorganic substrate and/or a polymer and methods for making such compositions.

In some embodiments, the inorganic particulate substrate, such as a filler, is combined with the aluminum-based coupling agent to form a first reactive particulate substrate, suitable for combining with a functionalized polymer to form a second reactive substrate or a composite material. In some embodiments, the first reactive particulate substrate is combined with a functionalized polymer, wherein the functionalized polymer has functional groups incorporated into the polymer chain, the functional groups are reactive with the first reactive particulate substrate, and the first reactive particulate substrate is reacted with the functionalized polymer to form a composite material of a reinforced polymer.

In some embodiments, the inorganic substrate is a monolithic article having at least one surface that has been combined with the aluminum-based coupling agent to form a first reactive surface, suitable for combining with a functionalized polymer to form a coated surface on the article. In some embodiments, the first reactive surface is combined with a functional polymer, wherein the functionalized polymer has functional groups incorporated into the polymer chain, the functional groups are reactive with the first reactive surface, and the first reactive surface is reacted with the functionalized polymer to form a coating of the functionalized polymer on the at least one surface.

In some embodiments, a functionalized polymer is combined with the aluminum-based coupling agent to form a first reactive polymer, suitable for combining with an inorganic substrate. In some embodiments, the first reactive polymer is combined with a particulate inorganic substrate to form a composite material of reinforced polymer. In some embodiments, the first reactive polymer is combined with at least one surface of a monolithic inorganic substrate to form to form a coating of the functionalized polymer on the at least one surface.

In some embodiments, the first reactive particulate substrate is combined with a secondary coupling agent to form a second reactive particulate substrate, suitable for combining with a functionalized polymer to form a composite material. In some embodiments, the second reactive particulate substrate is combined with a reactive monomer and/or functionalized polymer, wherein the reactive monomer polymerizes due to contact with the second reactive particulate substrate and/or the functionalized polymer has functional groups incorporated into the polymer chain, the functional groups are reactive with the second reactive particulate substrate, and the second reactive particulate substrate is reacted with the functionalized polymer to form a composite material of a reinforced polymer.

In some embodiments, the first reactive surface of the monolithic article is reacted with a secondary coupling agent to form a second reactive surface, suitable for combining with a functionalized polymer to form a coated surface on the article. In some embodiments, the second reactive surface is combined with a functional polymer, wherein the functionalized polymer has functional groups incorporated into the polymer chain, the functional groups are reactive with the second reactive surface, and the second reactive surface is reacted with the functionalized polymer to form a coating of the functionalized polymer on the at least one surface.

In some embodiments, the modified polymer is combined with a secondary coupling agent to form a second reactive polymer, suitable for combining with an inorganic substrate. In some embodiments, the second reactive polymer is combined with a particulate inorganic substrate to form a composite material of reinforced polymer. In some embodiments, the second reactive polymer is combined with at least one surface of a monolithic inorganic substrate to form to form a coating of the functionalized polymer on the at least one surface.

The foregoing has outlined rather broadly the features and technical advantages of the present invention in order that the detailed description of the invention that follows may be better understood. Additional features and advantages of the invention will be described hereinafter, which form the subject matter of the claims of the invention. It should be appreciated by those skilled in the art that the conception and specific embodiments disclosed may be readily utilized as a basis for modifying or designing other film structures and/or processes for carrying out the same purposes of the present invention. It should also be realized by those skilled in the art that such equivalent constructions do not depart from the spirit and scope of the invention as set forth in the appended claims. The novel features which are believed to be characteristic of the invention, both as to its structure and method of manufacture, together with further objects and advantages will be better understood from the following description.

DETAILED DESCRIPTION OF THE INVENTION

Illustrative embodiments of the subject matter claimed below will now be disclosed. In the interest of clarity, some features of some actual implementations may not be described in this specification. It will be appreciated that in the development of any such actual embodiments, numerous implementation-specific decisions must be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase. It must also be noted that, as used in the specification and the appended claims, the singular forms "a," "an," and "the" include plural references unless otherwise specified.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

Definitions

"Coated surface," as used herein, means a surface of a monolithic article having a layer of polymer covalently or ionically bonded to the surface. This includes all references to coatings, surface coatings, coating of a surface, and the like.

"Composite material," as used herein, means a reinforced polymer matrix comprising a dispersed inorganic particulate material, wherein the polymer is covalently or ionically bonded to the particulate material. A composite can be in the form of a masterbatch for blending into another polymer or direct addition of inorganic particulate material to a functionalized polymer, either case resulting in a macroscopically homogeneous dispersed phase of covalently or ionically bonded inorganic particulate matter in a matrix of one or more polymers.

"Coupling agent," as used herein, means a composition capable of directly or indirectly producing a covalent or ionic bond between an inorganic material and a functionalized polymer, wherein "directly" means that the coupling agent acts alone to form covalent or ionic bonds with both the inorganic material and a functionalized polymer, and "indirectly" means that the coupling agent acts in combination with another coupling agent. In such a combination, one coupling agent is covalently or ionically bonded to inorganic substrate, the other coupling agent is covalently or ionically bonded to the functionalized polymer, and the two coupling agents are covalently or ionically bonded to one another. Direct coupling agents can be bonded first to either the inorganic substrate or the functional polymer. Indirect coupling agents can be bonded first to the inorganic substrate, the functional polymer or the other coupling agent.

"Filler," as used herein, means a particulate suitable for suspension in a polymer matrix. In some embodiments, the filler is one or more from the group consisting of spherical, needle, fiber, and platelet. In some embodiments, a filler can refer to a mixture of two or more fillers of the same or different types.

"Functionalized polymer," as used herein, means a polymer having functional groups incorporated into the polymer chain or pendant from the polymer along the polymer chain, at one or more terminations of the polymer chain, or a combination thereof, wherein such functional groups are reactive with pendant groups on the surface of inorganic substrates. In some embodiments, such pendant groups are one or more members of the group consisting of carboxyl, carboxylic acid, anhydride, sulfhydryl, hydroxyl, alkoxy, carbonyl, epoxide, ketone, dihydrofuran-dione, aldehyde, imine, and primary, secondary, and tertiary amines. In some embodiments, a functionalized polymer can refer to a blend of two or more functionalized polymers having the same or different functional groups. Functionalized polymers can be of any molecular weight capable of being bonded to inorganic substrates, first reactive inorganic substrates, or second inorganic substrates, all as disclosed herein, and can range from oligomers having as few as two mer units, wherein the mer units can be the same or different, to the highest molecular weight that can be processed in an extruder.

"Inorganic substrate," as used herein, means any solid substance: 1) in which two or more chemical elements are combined, and there are no bonds between hydrogen and carbon as part of the molecular structure (i.e., hydrogen bonding to available electrons on the surface of the substrate are not considered part of the molecular structure); 2) containing only carbon, wherein such solid substance further comprises a concentration of reactive hydroxyl groups, oxygen groups, or a combination thereof (including but not limited to graphene oxide); or 3) any one or more Group 3-12 metals or alloys thereof.

"Monolithic substrate," as used herein, means an article comprising an inorganic substrate and having at least one surface suitable for application of a coating. A non-limiting list of suitable monolithic substrate composition includes metals, metal alloys, glass, ceramics, or combinations thereof.

"Particulate substrate," as used herein, means a filler comprising an inorganic substrate. A non-limiting list of suitable particulate substrate or filler compositions includes boron nitride, graphene, graphite, carbon, montmorillionite clay, fumed silica, spray dried silica, aluminum oxide, kaolinite, wollastonite, talc, calcium carbonate, minerals (including but not limited to zeolites with channels, layers, and mesopores, such as ZSM-5, ZSM-22, and ZSM-41, respectively), diatamaceous earths, or combinations thereof. A non-limiting list of suitable particulate substrate or filler shapes includes can be spherical, spheroidal, fibers, needles, platelets, or combinations thereof, although possible shape of a filler may be limited by the selected filler composition.

"Primary coupling agent," as used herein, means a coupling agent that can be a direct coupling agent, wherein it reacts to covalently or ionically bond with both an inorganic substrate and a functionalized polymer, or an indirect coupling agent, wherein it is reacted to form a covalent bond with the inorganic substrate and a covalent or ionic bond with secondary coupling agent.

"Secondary coupling agent," as used herein, means a coupling agent that can be used in combination with a direct coupling agent, wherein the secondary coupling agent reacts to covalently or ionically bond with both a primary coupling agent and a functionalized polymer.

"Spherical," as used herein, includes spherical and spheroidal shapes.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the disclosure.

Primary Coupling Agent

Primary coupling agents disclosed herein comprise coupling agents based on a Group 13 element, alumoxane-based coupling agents, or combinations thereof.

Group 13 Element-Based Coupling Agent

A Group 13 element-based coupling agent can be represented by Formula I.

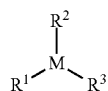

Formula I wherein:

M represents a Group 13 element; and $R^1$, $R^2$, and $R^3$ each independently represent hydrogen, a halogen, or a linear or branched hydrocarbyl having up to 20 carbons and optionally comprising one or more cyclic and/or aromatic structures and/or one or more hetero atoms, and comprise no olefinic unsaturation. In some embodiments, hetero atoms are selected from nitrogen, oxygen, phosphorus, sulfur, and selenium.

In some embodiments, $R^1$, $R^2$, and $R^3$ represents hydrogen, a halogen, a linear or branched alkyl group having from 1 to 10 carbons, or a hydrocarbyl group comprising a substituted or unsubstituted aryl group, less than or equal to 12 carbons, and no olefinic unsaturation, and $R^1$, $R^2$, and $R^3$ are independently the same or different.

In some embodiments, M is aluminum and $R^1$, $R^2$, and $R^3$ each independently represent a linear or branched alkyl group having up to 12 carbons and comprise no olefinic unsaturation.

In some embodiments, M is aluminum; $R^1$ represents hydrogen or a halogen, and $R^2$ and $R^3$ are the same or different and are each a linear or branched alkyl group having from 1 to 10 carbons, or a hydrocarbyl group comprising a substituted or unsubstituted aryl group, less than or equal to 12 carbons, having no olefinic unsaturation.

In some embodiments, M is aluminum and/or $R^1$, $R^2$, and $R^3$ are all methyl groups.

In some embodiments, a primary coupling agent is selected from one or more members of the group consisting of trimethyl aluminum ("TMA"), triethylaluminum ("TEAL"), triisobutylaluminum ("TIBAL"), diisobutylaluminum hydride ("DIBAL"), trihexylaluminum ("TNHAL"), trioctylaluminum ("TNOAL"), diethylaluminum ethoxide ("$Et_2AlOEt$"), diethylaluminum chloride ("$Et_2AlCl$"), ethylaluminum dichloride ("$EtAlCl_2$"), ethylaluminum sesquichloride $Et_3Al_2Cl_3$, isoprenylaluminum ("ISOPRENYL"), methyl alumoxane ("MAO"), diethylaluminum ethoxide ("$Et_2AlOEt$"), and dimethyl amide ("$Me_2AlNR_2$" where R is Me, Et, isopropyl ("iPr"), or tertiary butyl ("tBu")).

Alumoxane-Based Coupling Agent

Alumoxane-based coupling agents are typically represented by Formula II:

 Formula II wherein:

M represents a Group 13 element;

R represents a linear or branched alkyl group having from 1 to 10 carbons, or a hydrocarbyl group comprising a substituted or unsubstituted aryl group, less than or equal to 12 carbons, and has no olefinic unsaturation; and n is an integer in the range of from 1 to 100.

However, one of ordinary skill in the art would recognize that the exact composition of methylalumoxane is difficult to accurately characterize, and the composition varies based on the trimethylaluminum-to-water ratio used in producing methylalumoxane. Commercial methylalumoxane typically contains varying quantities of unreacted trimethylaluminum, which can be up to 30% of the aluminum content, but can be treated to remove most of the free trimethylaluminum. Examples of alumoxanes include methylalumoxane ("MAO"), modified methylalumoxane ("MMAO"), ethylalumoxane, and isobutylalumoxane. In some embodiments, alumoxane can refer to a mixture of two or more different alumoxanes and/or modified alumoxanes. An example of MMAO is commercially available from Akzo Chemicals, Inc. under the trade name Modified Methylalumoxane type 3A.

Secondary Coupling Agent

Secondary coupling agents disclosed herein comprise functional groups suitable to react with one or more of Lewis acids, Brønsted acids, and Group 13 element-alkyl bonds. In some embodiments, suitable secondary coupling agents comprise two or more functional groups. In some embodiments, secondary coupling agents comprise heteroatoms selected from one or more of nitrogen, oxygen, phosphorus, sulfur, and selenium. In some embodiments, secondary coupling agents comprise heteroatoms selected from one or more of nitrogen, oxygen, phosphorus, sulfur, and selenium. In some embodiments, secondary coupling agents have a nucleophilicity parameter of greater than or equal to 0, greater than or equal to 5, or greater than or equal to 10. In some embodiments, a secondary coupling agent is characterized by two or more of the foregoing attributes.

In some embodiments, secondary coupling agents are one or more members selected from the group consisting of amines, sulfides, phosphines, or combinations thereof.

Amine Compounds

An amino compound useful in this disclosure is characterized by the presence within its structure of at least one —NH— group; it can be a monoamine or polyamine compound. For purposes of this disclosure, hydrazine and substituted hydrazines containing up to three substituents are included as amino compounds suitable for preparing secondary coupling agents. Mixtures of two or more amino compounds can be used in the reaction with one or more epoxidized vinyl terminated macromonomer ("VTM")

reagents of this disclosure. In some embodiments, the amino compound contains at least one primary amino group (i.e., —NH$_2$). In some embodiments, the amine is a polyamine, especially a polyamine containing at least two —NH— groups, either or both of which are primary or secondary amines.

The monoamines and polyamines are characterized by the presence within their structure of at least one —NH— group. Therefore, they have at least one primary (i.e., H$_2$N—) or secondary amino (i.e., H—N=) group. The amines can be aliphatic, cycloaliphatic, aromatic, or heterocyclic, including aliphatic-substituted cycloaliphatic, aliphatic-substituted aromatic, aliphatic-substituted heterocyclic, cycloaliphatic-substituted aliphatic, cycloaliphatic-substituted heterocyclic, aromatic-substituted aliphatic, aromatic-substituted cycloaliphatic, aromatic-substituted heterocyclic, heterocyclic-substituted aliphatic, heterocyclic-substituted alicyclic, and heterocyclic-substituted aromatic amines and may be saturated or unsaturated. If unsaturated, the amine will be free from acetylenic unsaturation. The amines may also contain non-hydrocarbon substituents or groups as long as these groups do not significantly interfere with the reaction of the amines with the epoxidized VTM reagents of this disclosure. Such non-hydrocarbon substituents or groups include lower alkoxy, lower alkyl mercapto, nitro, interrupting groups such as —O— and —S— (e.g., as in such groups as —CH$_2$CH$_2$—XCH$_2$CH$_2$— where X is —O— or —S—).

With the exception of the branched polyalkylene polyamine, the polyoxyalkylene polyamines, and the high molecular weight hydrocarbyl-substituted amines described more fully hereafter, the amines ordinarily contain less than 40 carbon atoms in total and usually not more than 20 carbon atoms in total.

Aliphatic monoamines include mono-aliphatic and di-aliphatic substituted amines wherein the aliphatic groups can be saturated or unsaturated and straight or branched chain. Thus, they are primary or secondary aliphatic amines. Such amines include, for example, mono- and di-alkyl-substituted amines, mono and di-alkenyl-substituted amines, and amines having one N-alkenyl substituent and one N-alkyl substituent and the like. The total number of carbon atoms in these aliphatic monoamines will, as mentioned before, normally will not exceed 40 and usually not exceed 20 carbon atoms. Specific examples of such monoamines include ethylamine, diethylamine, n-butylamine, di-n-butylamine, allylamine, isobutylamine, cocoamine, stearylamine, laurylamine, methyllaurylamine, oleylamine, N-methyl-octylamine, dodecyl amine, octadecylamine, and the like. Examples of cycloaliphatic-substituted aliphatic amines, aromatic substituted aliphatic amines, and heterocyclic-substituted aliphatic amines, include 2-(cyclohexyl)-ethylamine, benzylamine, phenethylamine, and 3-(furylpropyl) amine.

Cycloaliphatic monoamines are those monoamines wherein there is one cycloaliphatic substituent attached directly to the amino nitrogen through a carbon atom in the cyclic ring structure. Examples of cycloaliphatic monoamines include cyclohexylamines, cyclopentylamines, cyclohexenylamines, cyclopentylamines, N-ethyl-cyclohexylamine, dicyclohexylamines, and the like. Examples of aliphatic-substituted, aromatic-substituted, and heterocyclic-substituted cycloaliphatic monoamines include propyl-substituted cyclohexylamines, phenyl-substituted cyclopentylamines, and pyranyl-substituted cyclohexylamine.

Aromatic amines include those monoamines wherein a carbon atom of the aromatic ring structure is attached directly to the amino nitrogen. The aromatic ring will usually be a mononuclear aromatic ring (i.e., one derived from benzene) but can include fused aromatic rings, especially those derived from naphthalene. Examples of aromatic monoamines include aniline, di(para-methylphenyl) amine, naphthylamine, N-(n-butyl)aniline, and the like. Examples of aliphatic-substituted, cycloaliphatic-substituted, and heterocyclic-substituted aromatic monoamines are para-ethoxyaniline, para-dodecylaniline, cyclohexylsubstituted naphthylamine, and thienyl-substituted aniline.

Polyamines are aliphatic, cycloaliphatic and aromatic polyamines analogous to the above-described monoamines except for the presence within their structure of another amino nitrogen. The other amino nitrogen can be a primary, secondary or tertiary amino nitrogen. Examples of such polyamines include N-aminopropyl-cyclohexylamines, N,N'-di-n-butyl-para-phenylene diamine, bis-(para-aminophenyl)methane, 1,4-diaminocyclohexane, and the like.

Heterocyclic monoamines and polyamines can also be used in making the dispersant compositions of this disclosure. As used herein, the terminology "heterocyclic mono- and polyamine(s)" is intended to describe those heterocyclic amines containing at least one primary or secondary amino group and at least one nitrogen as a heteroatom in the heterocyclic ring. However, as long as there is present in the heterocyclic-mono- and polyamines at least one primary or secondary amino group, the hetero-N atom in the ring can be a tertiary amino nitrogen; that is, one that does not have hydrogen attached directly to the ring nitrogen. Heterocyclic amines can be saturated or unsaturated and can contain various substituents such as nitro, alkoxy, alkyl mercapto, alkyl, alkenyl, aryl, alkaryl, or aralkyl substituents. Generally, the total number of carbon atoms in the substituents will not exceed 20. Heterocyclic amines can contain hetero atoms other than nitrogen, especially oxygen and sulfur. In some embodiments, heterocyclic amines can contain more than one nitrogen hetero atom. In some embodiments, heterocyclic amines comprise five-membered and/or six-membered heterocyclic rings.

Among the suitable heterocyclics are aziridines, azetidines, azolidines, tetra- and di-hydro pyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-aminoalkylpiperazines, N,N'-di-aminoalkylpiperazines, azepines, azocines, azonines, azecines and tetra-, di- and perhydro derivatives of each of the above and mixtures of two or more of these heterocyclic amines. In some embodiments, heterocyclic amines are the saturated 5- and 6-membered heterocyclic amines containing only nitrogen, oxygen and/or sulfur in the hetero ring, especially the piperidines, piperazines, thiomorpholines, morpholines, pyrrolidines, and the like. In some embodiments, piperidine, aminoalkylsubstituted piperidines, piperazine, aminoalkylsubstituted morpholines, pyrrolidine, and aminoalkylsubstituted pyrrolidines, are used. Usually, the aminoalkyl substituents are substituted on a nitrogen atom forming part of the hetero ring. Specific examples of such heterocyclic amines include N-aminopropylmorpholine, N-amnoethylpiperazine, and N,N-di-aminoethylpiperazine.

Hydroxyamines both mono- and polyamines, analogous to those described above are also useful as (a) provided they contain at least one primary or secondary amino group. Hydroxy-substituted amines having only tertiary amino nitrogen such as in tri-hydroxyethyl amine, are thus excluded as (a) (but can be used as (b) as disclosed hereafter). The hydroxy-substituted amines contemplated are those having hydroxy substituents bonded directly to a carbon atom other than a carbonyl carbon atom; that is, they have hydroxy groups capable of functioning as alcohols. Non-limiting examples of such hydroxy-substituted amines include ethanolamine, di-(3-hydroxypropyl)-amine, 3-hydroxybutyl-amine, 4-hydroxybutyl-amine, diethanolamine, di-(2-hydroxypropyl)-amine, N-(hydroxypropyl) propylamine, N-(2-hydroxyethyl)-cyclohexylamine, 3-hydroxycyclopentylamine, para-hydroxyaniline, N-hydroxyethyl piperazine, and the like.

Hydrazine and substituted-hydrazine can also be used. At least one of the nitrogens in the hydrazine must contain a hydrogen directly bonded thereto. In some embodiments, there are at least two hydrogens bonded directly to hydrazine nitrogen. In some embodiments, both hydrogens are on the same nitrogen. The substituents which may be present on the hydrazine include alkyl, alkenyl, aryl, aralkyl, alkaryl, and the like. Usually, the substituents are alkyl, especially lower alkyl, phenyl, and substituted phenyl such as lower alkoxy substituted phenyl or lower alkyl substituted phenyl. Non-limiting examples of substituted hydrazines include methylhydrazine, N,N-dimethyl-hydrazine, N,N'-dimethylhydrazine, phenylhydrazine, N-phenyl-N'-ethylhydrazine. N-(para-tolyl)-N'-(n-butyl)-hydrazine, N-(para-nitrophenyl)-hydrazine, N-(para-nitrophenyl)N-methyl-hydrazine, N,N'-di(para-chlorophenol)-hydrazine, N-phenyl-N'-cyclohexylhydrazine, and the like.

The high molecular weight hydrocarbyl amines, both mono-amines and polyamines, which can be used as (a) are generally prepared by reacting a chlorinated polyolefin having a molecular weight of at least 400 with ammonia or amine. Such amines are known in the art and described, for example, in U.S. Pat. Nos. 3,275,554 and 3,438,757, both of which are expressly incorporated herein by reference for their disclosure in regard to how to prepare these amines. All that is required for use of these amines is that they possess at least one primary or secondary amino group.

Another group of amines suitable for use are branched polyalkylene polyamines. The branched polyalkylene polyamines are polyalkylene polyamines wherein the branched group is a side chain containing on the average at least one nitrogen-bonded aminoalkylene (i.e., —NH$_2$—R—[NH—R]$_x$) group per nine amino units present on the main chain, for example, 1-4 of such branched chains per nine units on the main chain units. Thus, these polyamines contain at least three primary amino groups and at least one tertiary amino group.

Suitable amines also include polyoxyalkylene polyamines, e.g., polyoxyalkylene diamines and polyoxyalkylene triamines, having average molecular weights ranging from 200 to 4000, or from 400 to 2000. Illustrative examples of these polyoxyalkylene polyamines may be characterized by the formulae:

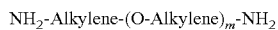

NH$_2$-Alkylene-(O-Alkylene)$_m$-NH$_2$ wherein m has a value of 3 to 70, or 10 to 35.

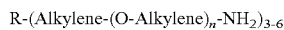

R-(Alkylene-(O-Alkylene)$_n$-NH$_2$)$_{3-6}$ wherein n is such that the total value is from 1 to 40 with the proviso that the sum of all of the n's is from 3 to 70 and generally from 6 to 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present within formulae (VI) and (VII) may be the same or different.

In some embodiments, polyoxyalkylene polyamines include the polyoxyethylene and polyoxypropylene diamines and the polyoxypropylene triamines having average molecular weights ranging from 200 to 2000. The polyetheramines (or polyoxyalkylene polyamines) are commercially available and may be obtained, for example, from Huntsman Corp. under the trade name "Jeffamines D-230, D-400, D-1000, D-2000, T-403".

In some embodiments, amines are the alkylene polyamines, including the polyalkylene polyamines. The alkylene polyamines include those conforming to the formula

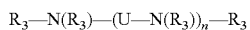

R$_3$—N(R$_3$)—(U—N(R$_3$))$_n$—R$_3$ wherein n is from 1 to 10; each R$_3$ is independently a hydrogen atom, a hydrocarbyl group or a hydroxy-substituted hydrocarbyl group having up to 30 atoms, with the proviso that at least one R$_3$ group is a hydrogen atom and u is an alkylene group of 2 to 10 carbon atoms. In some embodiments, U is ethylene or propylene. In some embodiments, the alkylene-polyamines are selected wherein each R$_3$ is hydrogen, and the ethylene polyamines and mixtures of ethylene polyamines are selected. Usually n will have an average value of from 2 to 7. Such alkylene polyamines include methylene polyamine, ethylene polyamines, butylene polyamines, propylene polyamines, pentylene polyamines, hexylene polyamines, heptylene polyamines, and the like. The higher homologs of such amines and related amino alkyl-substituted piperazines are also included.

Alkylene polyamines useful in preparing the dispersant compositions include ethylene diamine, triethylene tetramine, propylene diamine, trimethylene diamine, hexamethylene diamine, decamethylene diamine, hexamethylene diamine, decamethylene diamine, octamethylene diamine, di (heptamethylene) triamine, tripropylene tetramine, tetraethylene pentamine, trimethylene diamine, pentaethylene hexamine, di(trimethylene)triamine, N-(2-aminoethyl)piperazine, 1,4-bis(2, aminoethyl)piperazine, and the like. Higher homologs as are obtained by condensing two or more of the above-illustrated alkylene amines are useful as (a) as are mixtures of two or more of any of the afore-described polyamines.

Ethylene polyamines, such as those mentioned above, are especially useful for reasons of cost and effectiveness. Such polyamines are described in detail under the heading "Diamines and Higher Amines" in The Encyclopedia of Chemical Technology, Second Edition, Kirk and Othmer, Volume 7, pages 27-39, Interscience Publishers, Division of John Wiley and Sons, 1965, which is hereby incorporated by reference for the disclosure of useful polyamines. Such compounds are prepared most conveniently by the reaction of an alkylene chloride with ammonia or by reaction of an ethylene imine with a ring-opening reagent such as ammonia, etc. These reactions result in the production of the somewhat complex mixtures of alkylene polyamines, including cyclic condensation products such as piperazines.

Other useful types of polyamine mixtures are those resulting from stripping of the above-described polyamine mixtures. In this instance, lower molecular weight polyamines and volatile contaminants are removed from an alkylene polyamine mixture to leave as residue what is often termed "polyamine bottoms". In general, alkylene polyamine bottoms can be characterized as having less than two, usually less than one percent (by weight) material boiling below 200° C. In the instance of ethylene polyamine bottoms, which are readily available and found to be quite useful, the bottoms contain less than two percent (by weight) total diethylene triamine (DETA) or triethylene tetramine (TETA). A typical sample of such ethylene polyamine bottoms obtained from the Dow Chemical Company of Freeport, Tex. designated "E-100" showed a specific gravity at 15.6° C. of 1.0168, a percent nitrogen by weight of 33.15 and a viscosity at 40° C. of 121 centistokes. Gas chromatography analysis of such a sample showed it to contain 0.93% "Light Ends" (DETA), 0.72% TETA, 21.74% tetraethylene pentamine and 76.61% pentaethylene hexamine and higher (by weight). These alkylene polyamine bottoms include cyclic condensation products such as piperazine and higher analogs of diethylene triamine, triethylene tetramine and the like.

These alkylene polyamine bottoms can be reacted solely with the epoxidizing agent, in which case the amino reactant consists essentially of alkylene polyamine bottoms, or they can be used with other amines and polyamines, or alcohols or mixtures thereof. In these latter cases at least one amino reactant comprises alkylene polyamine bottoms.

Hydroxylalkyl alkylene polyamines having one or more hydroxyalkyl substituents on the nitrogen atoms, are also useful in preparing dispersant compositions. In some embodiments, hydroxylalkyl-substituted alkylene polyamines are those in which the hydroxyalkyl group is a lower hydroxyalkyl group, i.e., paving less than eight carbon atoms. Examples of such hydroxyalkyl-substituted polyamines include N-(2-hydroxyethyl)ethylene diamine,N, N-bis(2-hydroxyethyl)ethylene diamine, 1-(2-hydroxyethyl) piperazine, monohydroxypropyl-substituted diethylene triamine, dihydroxypropyl-substituted tetraethylene pentamine, N-(2-hydroxybutyl)tetramethylene diamine, and the like. Higher homologs as are obtained by condensation of the above-illustrated hydroxy alkylene polyamines through amino radicals or through hydroxy radicals are likewise useful as (a). Condensation through amino radicals results in a higher amine accompanied by removal of ammonia and condensation through the hydroxy radicals results in products containing ether linkages accompanied by removal of water.

The amination process of this disclosure can be carried out by conventional methods known in the art. The process parameters should be sufficient to convert the epoxidized VTM to the amine product. Amination reaction conditions for the conversion of the epoxidized VTM to the amine, such as temperature, pressure and contact time, may also vary greatly and any suitable combination of such conditions may be employed herein. The reaction temperature may range between 25° C. to 250° C., between 30° C. to 200° C., or between 60° C. to 150° C. Normally the reaction, optionally conducted with or without solvent, is carried out under ambient pressure and the contact time may vary from a matter of seconds or minutes to a few hours or greater. The reactants can be added to the reaction mixture or combined in any order. The stir time employed can range from 0.2 to 48 hours, from 1 to 36 hours, or from 2 to 24 hours.

Illustrative secondary coupling agents of this disclosure include, for example, the amination product of an epoxidized VTM and an amino compound containing at least one —NH— group, wherein the epoxidized VTM is reacted with the amino compound under amination conditions sufficient to give the primary coupling agent.

In particular, illustrative primary coupling agents of this disclosure include, for example, amination products of an epoxidized atatic polypropylene having a molecular weight equivalent to 1000 with 3-aminopropyl morpholine or tetraethylenpetamine.

In accordance with this disclosure, the primary coupling agents can be represented by the formula $R_1R_2$ or $R_1(X)R_3$ wherein $R_1$ is a VTM group having from 10 to 400 carbon atoms, $R_2$ is an amino group containing at least one —NH— group, X is a polyamino group containing at least two —NH— groups, and $R_3$ is a VTM group having from 10 to 400 carbon atoms; wherein $R_1$ and $R_3$ are the same or different.

In an embodiment, the amine primary coupling agent can be further reacted with a compound having other functionality to give a multifunctional primary coupling agent. An illustrative multifunctional dispersant molecule prepared by the process of this disclosure is represented by the formula:

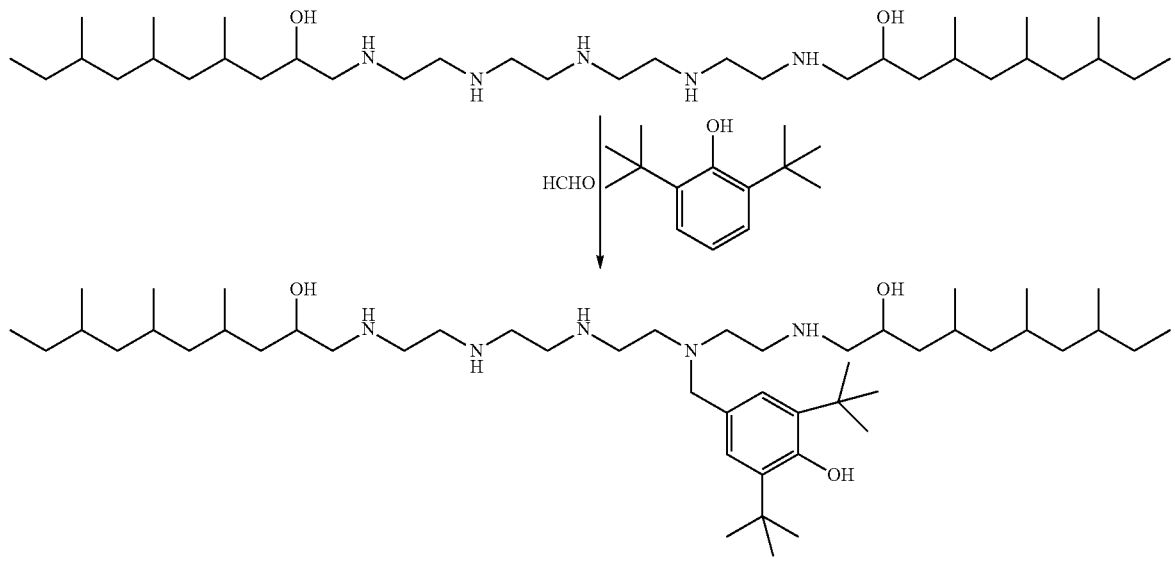

In some embodiments, primary coupling agents prepared, for example, using atactic polypropylene with vinyl termination as the hydrocarbon portion and polyamine as head portion of the molecules connected via linking group based on epoxidation chemistry. In some embodiments, the epoxidation is achieved preferably based on hydrogen peroxide chemistry.

Suitable diamines include, but are not limited to, ethylene diamine and ethylenediamine tetra acetic acid. Carboxylic amino acids and methods of making such composition are disclosed in U.S. Pat. Nos. 2,384,818, 2,387,735, and 3,061,628, all of which are incorporated herein by reference for all jurisdictions in which such incorporation is permitted.

Suitable triamines include, but are not limited to, diethylene triamine and ethylenediamine tetra acetic acid.

Suitable polyamines include, but are not limited to, triethylene tetraamine and tetraethylpentamine.

Suitable polyetheramines include, but are not limited to:
O,O'-Bis(2-aminopropyl) polypropylene glycol-block-polyethylene glycol-block-polypropylene glycoll (Jeffamine™ ED 600, available from Sigma-Aldrich as product no. 14526), formula: $H_3CH(NH_2)CH_2[OCH(CH_3)CH_2]_l(OCH_2CH_2)_m[OCH_2CH(CH_3)]_nNH_2$;

O,O'-Bis(2-aminopropyl) polypropylene glycol-block-polyethylene glycol-block-polypropylene glycol (Jeffamine™ ED 900, available from Sigma-Aldrich), formula: $CH_3CH(NH_2)CH_2[OCH(CH_3)CH_2]_l(OCH_2CH_2)_m[OCH_2CH(CH_3)]_nNH_2$);

poly(propylene glycol) bis(2-aminopropyl ether), (available from Sigma-Aldrich as product no. 406694, average $M_n$~4,000; product no. 406651, average Mn~230), formula: $CH_3CH(NH_2)CH_2[OCH_2CH(CH_3)]_nNH_2$, structure:

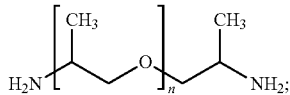

Poly(ethylene glycol) diamine (also called O,O'-Bis(2-aminoethyl)polyethylene glycol, Polyoxyethylene bis(amine), Diaminopolyethylene glycol, or PEG-diamine (shorthand)), (available from Sigma-Aldrich as product no. 753084, Mn~2,000), structure:

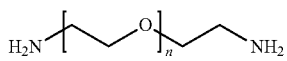

Structure:

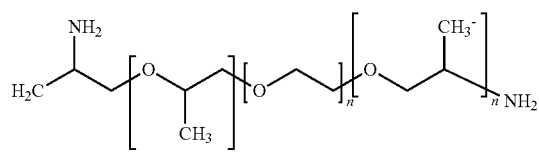

where m~39, (l+n)~6, molecular weight is 2125 (Jeffamine™ D2000, Jeffamines generally comprised of blocks of propylene glycol, then ethylene glycol, then propylene glycol, with the chain ends as shown);

Trimethylolpropane tris(poly(propylene glycol), amine terminated] ether (available from Sigma-Aldrich as product no. 406708, average Mn~440), structure:

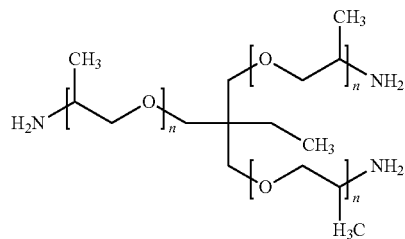

A four arm star of PEG-amine (available from Sigma-Aldrich as product no. JKA7032, average $M_n$~2,000), structure: 4arm-PEG2K-NH$_2$ with core of pentaerythritol (average $M_n$ from ~2,000 to ~20,000), structure:

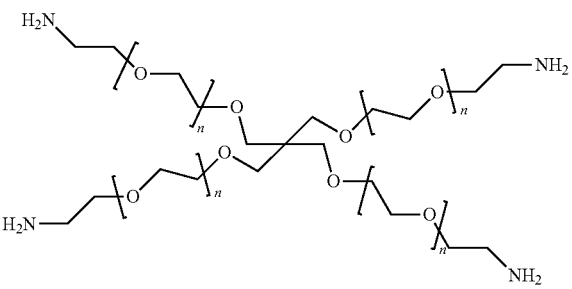

4,4'-Diaminodiphenylmethane, molecular weight=198.26. formula: $C_{13}H_{14}N_2$, structure:

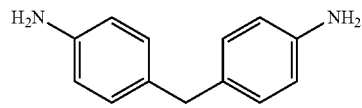 [SMILES: Nc1ccc(Cc2ccc(N)cc2)cc1]

O-(2-Aminopropyl)-O'-(2-methoxyethyl)polypropylene glycol (Jeffamine™ M-600, monoamine should react with treated filler or treated surface on monolithic article to produce monolayer polymer coronas, available from Sigma-Aldrich as product no. 422118), structure:

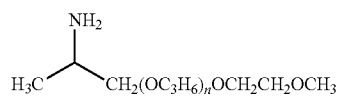

PEG analog of Jeffamine™ M-600 where the parenthesized monomer is (OC$_2$H$_4$)

Polyalkylenepolyamines and methods of making are disclosed in U.S. Pat. No. 4,578,517A, which is fully incorporated herein by reference for all jurisdictions in which such incorporation is permitted.

Polyvinylpolyamines and methods of making are disclosed in U.S. Pat. No. 5,391,710A and *Polyvinylamine: A Tool for Engineering Interfaces*, Langmuir 2014, 30, 15373-15382, ACS Publications, both of which are fully incorporated herein by reference for all jurisdictions in which such incorporation is permitted.

Polyalkylenepolyamines and methods of making are disclosed in U.S. Pat. No. 4,617,418, which is fully incorporated herein by reference for all jurisdictions in which such incorporation is permitted.

In some embodiments, reference to a secondary coupling agent means a mixture of two or more secondary coupling agents.

Functionalized Polymers

Suitable functionalized polymers comprise one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines.

In some embodiments, the functional groups of the functionalized polymer are suitable to react with one or more of Lewis acids, Brønsted acids, and Group 13 element-alkyl bonds to form covalent or ionic bonds. In some embodiments, the functional groups of the functionalized polymer are suitable to react with an available (i.e., not having been previously reacted with another compound) functional group of a secondary coupling agent.

In some embodiments, functional groups of the functionalized polymer have a nucleophilicity parameter of greater than or equal to 0, greater than or equal to 5, or greater than or equal to 10.

In some embodiments, the polymer to which one or more functional groups are appended or into which one or more functional groups are incorporated include, but are not limited to polyethylene, polypropylene, polystyrene, polycarbonate, poly(vinyl chloride), poly(dimethyl siloxane), poly(propylene carbonate), poly(methyl methacrylate), polyimide, polystyrene, natural rubber, poly(butylene terephthalate), polylactide, vinyl polymers, polyesters, polyethers, poly(organophosphazene), polyurethane, and poly(dimethylsiloxane). In some embodiments, copolymers have randomly distributed comonomers, blocks of comonomers, or a combination thereof. In some embodiments, reference to a functionalized polymer means a mixture of two or more functionalized polymers.

In some embodiments, functional groups of the functionalized polymer are characterized by two or more of the foregoing attributes.

In some embodiments, a functionalized polymer comprises a maleated ethylene-propylene rubber ("EPR-g-IA"). In some instances, the MA is present in the EPR-g-MA in the range of 0.5 wt % to 3.0 wt % of the total polymer weight. Suitable EPR-g-MA compositions include Exxelor™ polymers, available from ExxonMobil Chemical Co.

In some embodiments, a functionalized polymer comprises a maleated polypropylene ("PP-g-MA"). In some instances, the MA is present in the PP-g-MA in the range of 0.5 wt % to 3.0 wt % of the total polymer weight. Suitable PP-g-MA compositions include Polybond™ polymer modifiers, available from Crompton.

In other embodiments, epoxy monomers (such as, but not limited to, Bisphenol A), epoxy resins, or epoxidized resins (such as, but not limited to, a polyolefin that is functionalized with epoxy groups) can be used. Epoxy compositions can provide resistance to heat and/or chemical degradation. Some types of epoxy compounds provide excellent adherence to wood, metal, glass, stone, and some plastics. Major applications of epoxy compositions include coatings, flooring, concrete restoration, crack repair, and as joint material for tiles.

In other embodiments, isocyanate terminated resins can be used. Isocyanate terminated resins can be used either as two-component systems with polyol or amine systems, or as one-component moisture-curing systems. Major applications of isocyanate terminated resins include use in coatings, adhesives, and impermeable or elastomer systems depending on their type and content.

In other embodiments, acrylic acid copolymers (such as, but not limited to Escor™ 5100, available from ExxonMobil Chemical Co.) and terpolymers can be used. Such polymers offer excellent adhesion to polar substrates without the need for primers.

Inorganic Substrates

Inorganic substrates, as used herein, include, but are not limited to any solid material: 1) in which two or more chemical elements are combined, and there are no bonds between hydrogen and carbon as part of the molecular structure (i.e., hydrogen bonding to available electrons on the surface of the substrate are not considered part of the molecular structure); 2) containing only carbon, wherein such solid substance further comprises a concentration of reactive hydroxyl groups, oxygen groups, or a combination thereof; or 3) any one or more Group 3-12 metals or alloys thereof.

In some embodiments, the inorganic substrate has a surface comprising hydroxyl groups in a concentration of greater than or equal to 0.2 hydroxyls/100 $\text{Å}^2$, greater than or equal to 1.0 hydroxyls/100 $\text{Å}^2$, greater than or equal to 2.0 hydroxyls/100 $\text{Å}^2$, or greater than or equal to 3.0 hydroxyls/100 $\text{Å}^2$.

In some embodiments, it is believed, without wishing to be bound by any particular theory, that the inorganic substrate has a surface comprising μ-bonded oxygen groups in a concentration of greater than or equal to 0.1 μ-oxo groups/100 $\text{Å}^2$, greater than or equal to 0.5 μ-oxo groups/100 $\text{Å}^2$, greater than or equal to 1.0 μ-oxo groups/100 $\text{Å}^2$, or greater than or equal to 1.5 μ-oxo groups/100 $\text{Å}^2$. It is noted here that, for the purposes of this invention, μ-oxo groups are defined to be those created from dehydration of a fully hydroxylated surface. Thus, for example, a fully hydroxylated silica surface is comprised of ~4 SI—OH groups per nm$^2$ (or per 100 Angstroms$^2$) and by this definition the surface possesses zero μ-oxo groups. The surface can be dehydroxylated where the products of dehydroxylation are water and a Si—O—Si (or μ-oxo) bond. For a fully dehydroxylated surface, then, the [Si—O—Si] concentration is 2 per nm$^2$. Partial dehydration will lead to [Si—OH] of greater than zero but less than 4. Correspondingly the μ-oxo concentration is <: 2 and >0.

In some embodiments, the inorganic substrate has a surface comprising hydroxyl groups in a concentration of greater than or equal to 0.2 hydroxyls/100 $\text{Å}^2$, greater than or equal to 1.0 hydroxyls/100 $\text{Å}^2$, greater than or equal to 2.0 hydroxyls/100 $\text{Å}^2$, or greater than or equal to 3.0 hydroxyls/100 $\text{Å}^2$, and are believed to comprise μ-bonded oxygen groups in a concentration of greater than or equal to 0.1 μ-oxo groups/100 $\text{Å}^2$, greater than or equal to 0.5 μ-oxo groups/100 $\text{Å}^2$, greater than or equal to 1.0 μ-oxo groups/100 $\text{Å}^2$, or greater than or equal to 1.5 μ-oxo groups/100 $\text{Å}^2$.

In some embodiments, the inorganic substrate has a surface comprising hydroxyl groups in a concentration in the range of from 1.0 hydroxyls/100 $\text{Å}^2$ to 4.0 hydroxyls/100 $\text{Å}^2$, from 1.5 hydroxyls/100 $\text{Å}^2$ to 3.8 hydroxyls/100 $\text{Å}^2$, from 2.0 hydroxyls/100 $\text{Å}^2$ to 3.6 hydroxyls/100 $\text{Å}^2$, or from 2.5 hydroxyls/100 $\text{Å}^2$ to 3.4 hydroxyls/100 $\text{Å}^2$.

In some embodiments, the inorganic substrate is believed to have a surface comprising μ-bonded oxygen groups in a concentration in the range of from 0.5 μ-oxo groups/100 $\text{Å}^2$ to 2.0 μ-oxo groups/100 $\text{Å}^2$, from 0.75 μ-oxo groups/100 $\text{Å}^2$ to 1.9 μ-oxo groups/100 $\text{Å}^2$, from 1.0 μ-oxo groups/100 $\text{Å}^2$ to 1.8 μ-oxo groups/100 Å$^2$, or from 1.25 μ-oxo groups/100 Å$^2$ to 2.0 μ-oxo groups/100 Å$^2$.

In some embodiments, the inorganic substrate has a surface comprising hydroxyl groups in a concentration in the range of from 1.0 hydroxyls/100 Å$^2$ to 4.0 hydroxyls/100 Å$^2$, from 1.5 hydroxyls/100 Å$^2$ to 3.8 hydroxyls/100 Å$^2$, from 2.0 hydroxyls/100 Å$^2$ to 3.6 hydroxyls/100 Å$^2$, or from 2.5 hydroxyls/100 Å$^2$ to 3.4 hydroxyls/100 Å$^2$, and are believed to comprise μ-bonded oxygen groups in a concentration in the range of from 0.5 μ-oxo groups/100 Å$^2$ to 2.0 μ-oxo groups/100 Å$^2$, from 0.75 μ-oxo groups/100 Å$^2$ to 1.9 μ-oxo groups/100 Å$^2$, from 1.0 μ-oxo groups/100 Å$^2$ to 1.8 μ-oxo groups/100 Å$^2$, or from 1.25 μ-oxo groups/100 Å$^2$ to 2.0 μ-oxo groups/100 Å$^2$.

In some embodiments, the inorganic substrate has a hardness, as measured by Young's modulus, of greater than or equal to 1.0 GPa, greater than or equal to 5.0 GPa, greater than or equal to 50 GPa, greater than or equal to 100 GPa, greater than or equal to 250 GPa, or greater than or equal to 500 GPa.

In some embodiments, the inorganic substrate has a hardness, as measured by Young's modulus, of in the range of from to 2.0 GPa to 3.0 TPa, from to 10 GPa to 2.9 TPa, from to 25 GPa to 2.8 TPa, from to 50 GPa to 2.7 TPa, from to 75 GPa to 2.6 TPa, or from to 100 GPa to 2.5 TPa.

In some embodiments, one or more surfaces of inorganic substrates comprise a concentration of hydroxyl groups, a concentration of μ-bonded oxygen groups, or a combination thereof, suitable for reacting with a primary coupling agent, a secondary coupling agent, or a functionalized polymer. Surface properties of the inorganic substrate can be modified by application of heat to the inorganic substrate in inert conditions. Heat is first applied to drive off adventitious water resulting in a concentration of surface hydroxyl groups. Additional heat input results in a reduction in surface hydroxyl groups and a corresponding increase in μ-bonded oxygen groups. In some embodiments, ultimate mechanical properties of a composite material or surface properties of a coated surface of an article can be controlled by the amount of heat applied to the inorganic substrate.

In some embodiments, inorganic substrates are covalently or ionically bonded to one or more primary coupling agents. In embodiments wherein aluminum oxide is the inorganic substrate, the aluminum oxide can be covalently or ionically bonded to a primary coupling agent, a secondary coupling agent, or a functionalized polymer.

Particulate Substrates

In some embodiments, the inorganic substrate is a particulate substrate, including nano particles, suitable for distribution and/or suspension in a matrix of a functionalized polymer. In some embodiments, the particulate substrate is covalently or ionically bonded to the functionalized polymer through the primary coupling agent (as disclosed herein). In some embodiments, the particulate substrate is covalently or ionically bonded to the functionalized polymer through covalent or ionic bonds between the particulate substrate and the primary coupling agent, the primary coupling agent and the secondary coupling agent (as disclosed herein), and the secondary coupling agent and the functionalized polymer.

In some embodiments, the composition of the particulate substrate is selected from one or more of aluminum oxide ("Al$_2$O$_3$"), barium sulfate ("BaSO$_4$"), boron nitride, calcium carbonate ("CaCO$_3$"), calcium oxide ("CaO", lime), calcium sulfate ("CaSO$_4$"), carbon black, carbon nanotubes ("CNTs"), diatamaceous earths, ferric oxide ("Fe$_2$O$_3$"), graphene, graphite, hydroxyapatite, kaolinite, magnesium oxide ("MgO"), metal powders, minerals, montmorillionite clay, piezoelectric ceramics, Portland cement, silica, talc, titanium dioxide ("TiO$_2$"), wollastonite, zinc oxide ("ZnO"), aramid or other organic derived fibers, or combinations thereof.

In some embodiments, the composition of the particulate substrate is selected from one or more of aluminum oxide ("Al$_2$O$_3$"), barium sulfate ("BaSO$_4$"), boron nitride, calcium carbonate ("CaCO$_3$"), calcium oxide ("CaO"), calcium sulfate ("CaSO$_4$"), carbon black, carbon nanotubes ("CNTs"), diatomaceous earths, ferric oxide ("Fe$_2$O$_3$"), graphene, graphite, hydroxyapatite, kaolinite, magnesium oxide ("MgO"), metal powders, minerals, montmorillionite clay, piezoelectric ceramics, Portland cement, talc, titanium dioxide ("TiO$_2$"), wollastonite, zinc oxide ("ZnO"), aramid or other organic derived fibers, zeolites, aluminosilicates, or combinations thereof.

The particulate substrates or fillers can be of various types and/or shapes, including spherical, needle, fiber, and platelet.

Spherical (e.g., silica, titania, etc.) includes spheroidal or any other three-dimensional shape that approximates a sphere.

Needle includes tubes (e.g., carbon nanotubes) or any other rigid or substantially rigid three-dimensional shape where one dimension the filler in a Euclidean coordinate system is substantially greater than the other two dimensions. In some embodiments, where the cross-section of a needle is substantially a circle, the needle type filler has a length to diameter ratio greater than 2, greater than 5, greater than 10, or greater than 25.

Fiber (e.g., glass fibers) includes flexible three-dimensional shape where one dimension the filler in a Euclidean coordinate system is substantially greater than the other two dimensions. In some embodiments, where the cross-section of a fiber is substantially a circle, the needle type filler has a length to diameter ratio greater than 2, greater than 5, greater than 10, or greater than 25.

Platelet (e.g., clays, graphene, graphite oxide, graphene oxide, etc.) or any other rigid or substantially rigid three-dimensional shape where one dimension of the filler in a Euclidean coordinate system is substantially less than the other two dimensions. In some embodiments, where the cross-section of a needle is substantially a circle, the platelet type filler has a thickness to diameter ratio less than 5, greater than 10, greater than 25, or greater than 50. Each platelet is comprised of a stack of sheets where each sheet is less than 1 nm thick. Ions generally reside between the sheets for charge balance.

It is intended that these categories encompass all or most commercially available fillers, but any shape of filler included within the scope of this disclosure (e.g., cube, rectangular cuboid, tetrahedron, etc.). The primary limitation on the shape is the selected composition for the particulate substrate—i.e., some materials are not suited to form certain shapes.

In some embodiments, reference to a particulate substrate or filler means a mixture of two or more particulate substrates or fillers.

Monolithic Substrates

In general, a monolithic substrate comprises at least one surface or a portion of at least on surface on an article. The surface can be of any configuration, including, but not limited to, flat, curved, smooth, textured, corrugated, ridged, fluted, channeled, furrowed, grooved, crimped, folded, crinkled, bent, twisted, spiral, or combinations thereof.

Nonlimiting examples of monolithic substrates are metals, metal alloys, glass, ceramics, or combinations thereof.

First Reactive Substrates

First reactive substrates are the reaction product of an inorganic substrate and one or more primary coupling agents. Without wishing to be bound by any particular theory, it is believed that the hydroxyl groups and/or μ-bonded oxygen groups react with the primary coupling agent to form a covalent or ionic bond between the inorganic substrate and the one or more primary coupling agents.

In some embodiments, without wishing to be bound by any particular theory, it is believed that the surface of the first reactive substrate comprises one or more of Lewis acids, Brønsted acids, and Group 13 element-alkyl bonds, suitable for reaction with one or more secondary coupling agents or one or more functionalized polymers.

In some embodiments, at least 30%, 40%, 50%, 60%, 70%, 80%, or 90% of the concentration of hydroxyl groups on the surface of the inorganic substrate are reacted with the Group 13 element-based coupling agent. In some embodiments, the concentration of hydroxyl groups on the surface of the inorganic substrate which are reacted with the Group 13 element-based coupling agent is decreased, for instance, to below 50%, by increasing the number of hydroxyl groups on the surface of the inorganic substrate, increasing the steric bulk of the Group 13 element-based coupling agent, or a combination thereof. In some embodiments, at least 50%, 60%, 70%, 80%, or 90% of the concentration of μ-bonded oxygen groups on the surface of the inorganic substrate are reacted with the Group 13 element-based coupling agent. In some embodiments, at least 50%, 60%, 70%, 80%, or 90% of the concentration of hydroxyl groups on the surface of the inorganic substrate, and at least 50%, 60%, 70%, 80%, or 90% of the concentration of μ-bonded oxygen groups on the surface of the inorganic substrate are reacted with the Group 13 element-based coupling agent.

In some embodiments, the hydroxyl groups, the μ-bonded oxygen groups, or a combination thereof, on the surface of the inorganic substrate are reacted with the Group 13 element-based coupling agent to form a monolayer of the reacted Group 13 element-based coupling agent on the surface of the inorganic substrate. "Monolayer," in this context, means that the group 13 coupling agent has reached the maximum level of attachment—i.e., analogous to titration, where no more of that group 13 coupling agent can be bound. This amount will vary depending on the agent due to primarily sterics, but temperature, time, or a combination thereof could play a secondary role.

Surface properties of the first reactive substrate can be controlled by selection of the one or more primary coupling agents. In some embodiments, the surface reactivity of the first reactive substrate is reduced by selecting one or more primary coupling agents having a higher molecular weight and/or more bulky configuration, wherein the density of reactive sites on the surface of the first reactive substrate is reduced by steric interferences or adding less coupling agent to the first reactive substrate than required to cover or react completely with the surface, limiting the density of molecules of primary coupling agent that can bond with the inorganic substrate. In some embodiments, ultimate mechanical properties of a composite material or surface properties of a coated surface of an article can be controlled by the amount of selection of the molecular weight and/or configuration of the one or more primary coupling agents.

First Reactive Filler

A first reactive filler comprises a calcined aluminum oxide nanoparticle composition and/or a first reactive substrate composition. Aluminum oxide useful in the calcined aluminum oxide nanoparticle composition can include α, γ, θ, δ, η phases, or combinations thereof, wherein such phases have different crystalline formations depending on defect locations of aluminum atoms. Some of these phases In some embodiments, the first reactive substrate from which the first reactive filler is derived, comprises a particulate inorganic substrate selected from the list consisting of:
  a) a spherical filler;
  b) a needle filler;
  c) a fiber filler;
  d) a platelet filler; and
  e) a combination thereof.

In some embodiments, the first reactive filler is a spherical filler comprising silica, titania, alumina, graphite, graphene, clay, or a combination thereof.

First Reactive Monolithic Substrates

In some embodiments, the first reactive monolithic substrate is at least one surface of an article, wherein the at least one surface comprises a calcined aluminum oxide composition and/or a first reactive substrate, as previously described.

Hydrolyzed Reactive Substrates

In some embodiments, a first reactive substrate is reacted with water for form a partially or fully hydrolyzed reactive substrate composition. In some embodiments, the amount of water is sub-stoichiometric such that only a portion of the reacted primary coupling agent is hydrolyzed. In some embodiments, the amount of water is stoichiometric such that all of the reacted primary coupling agent is hydrolyzed. In some embodiments, the amount of water exceeds stoichiometric such that all of the reacted primary coupling agent is hydrolyzed with excess water remaining.

"Stoichiometric," in this context, means that water reacts with all the surface Al—R groups (as defined above), such that the resulting surface of the substrate comprises Al—(OH) and Al-(μ-bonded O—Al groups). The consumption of the Al—R bonds can be measured most readily for example by gas evolution of methane or ethane from bound TMA or bound TEAL, respectively, and this then quantified by properly calibrated gas chromatography (single injection) from head space (known as "HSGC") or multi extraction head space (known as "MEHSGC"). Sub-stoichiometric means that water reacts with less than all the surface Al—R groups (as defined above), such that the resulting surface of the substrate comprises Al—R groups (as defined above), Al—(OH) and Al-(μ-bonded O—Al groups).

Second Reactive Substrates

Second reactive substrates are the reaction product of base composition and a portion of one or more secondary coupling agents, wherein each secondary coupling agent has at least two functional groups. Without wishing to be bound by any particular theory, it is believed that one or more of Lewis acids, Brønsted acids, and/or Group 13 element-alkyl bonds hydroxyl groups and/or μ-bonded oxygen groups on the surface of the first reactive coupling agent react with one or more functional groups of the one or more secondary coupling agent to form a covalent or ionic bond between the first reactive substrate and the one or more secondary coupling agents.

Second Reactive Particulate Substrates

A first reactive filler comprises a calcined aluminum oxide nanoparticle composition and/or a first reactive substrate composition. In some embodiments, the first reactive substrate from which the first reactive filler is derived, comprises a particulate inorganic substrate selected from the list consisting of:
  a) a spherical filler;
  b) a needle filler;

c) a fiber filler;
d) a platelet filler; and
e) a combination thereof.

In some embodiments, the first reactive filler is a spherical filler comprising silica, titania, alumina, graphite, graphene, clay, or a combination thereof.

Second Reactive Monolithic Substrates

In some embodiments, the first reactive monolithic substrate is at least one surface of an article, wherein the at least one surface comprises a calcined aluminum oxide composition and/or a first reactive substrate, as previously described.

Composite Materials

A first composite material disclosed herein comprises the reaction product of a first reactive filler and a functionalized polymer, wherein the functionalized polymer comprises one or more functional groups capable of forming a covalent or ionic bond with the reacted Group 13 element-based coupling agent. In some embodiments, a first composite material disclosed herein comprises the reaction product of two or more different first reactive fillers and a functionalized polymer. In some embodiments, a first composite material disclosed herein comprises the reaction product of a first reactive filler and two or more different functionalized polymers. In some embodiments, a first composite material disclosed herein comprises the reaction product of two or more different first reactive fillers and two or more different functionalized polymers.

A second composite material disclosed herein comprises the reaction product of a second reactive filler and a functionalized polymer, wherein the functionalized polymer comprises one or more functional groups capable of forming a covalent or ionic bond with the at least one other functional group, or in other words one or more functional groups of the secondary coupling agent that did not react during formation of the second reactive filler. In some embodiments, a second composite material disclosed herein comprises the reaction product of two or more different second reactive fillers and functionalized polymer. In some embodiments, a second composite material disclosed herein comprises the reaction product of a second reactive filler and two or more different functionalized polymers. In some embodiments, a second composite material disclosed herein comprises the reaction product of two or more different second reactive fillers and two or more different functionalized polymers.

Coated Surface

In some embodiments, a first coating is formed on at least one surface of an article, wherein the surface comprises a calcined aluminum oxide composition and/or a first reactive substrate, as previously described, by the reaction product of the at least one surface and a functionalized polymer, wherein the functionalized polymer comprises one or more functional groups capable of forming a covalent or ionic bond with the reacted Group 13 element-based coupling agent and/or the calcined aluminum oxide composition. In some embodiments, a first coating is formed on at least one surface of an article, wherein the surface comprises a calcined aluminum oxide composition and/or a first reactive substrate, as previously described, by the reaction product of the at least one surface and two or more different functionalized polymers.

In some embodiments, a second coating is formed on at least one surface of an article, wherein the surface comprises unreacted functional groups from one or more secondary coupling agents reacted to form the second reactive substrate, as previously described, by the reaction product of the at least one surface and a functionalized polymer, wherein the functionalized polymer comprises one or more functional groups capable of forming a covalent or ionic bond the unreacted functional groups of the secondary coupling agent. In some embodiments, a second coating is formed on at least one surface of an article, wherein the surface comprises unreacted functional groups from one or more secondary coupling agents reacted to form the second reactive substrate, by the reaction product of the at least one surface and two or more different functionalized polymers.

End-Use Applications

In some embodiments, the composite material comprises a nanocomposite. A nanocomposite is a polymer matrix to which nanoparticles have been added to improve one or more properties of the polymer. Nanocomposites have been used to produce batteries having increased power output. Anodes for lithium-ion batteries formed using a composite comprising silicon nanospheres and carbon nanoparticles make closer contact with the lithium electrolyte, which allows faster charging or discharging of power.

In the medical field, nanotube-polymer nanocomposites have been used to form guides for growth of replacement bone. Nanocomposites are used for producing structural components with a high strength-to-weight ratio in many industrial and transportation-related applications. For example, longer windmill blades become practical using epoxy containing carbon nanotubes can be used to produce nanotube-polymer composite windmill blades, allowing an increase in the electricity generated by an individual windmill.

Even higher strength-to-weight ratios can be achieved using graphene to make composites. Adding graphene to epoxy composites may result in stronger/stiffer components than epoxy composites using a similar weight of carbon nanotubes. Graphene appears to bond better to the polymers in the epoxy, allowing a more effective coupling of the graphene into the structure of the composite. This property could result in the manufacture of components with higher strength-to-weight ratios for aircraft components.

In some end-use embodiments, nanocomposites can be used in a number of automotive and aircraft applications, including, but not limited to: engine parts; chassis and bodywork; fuel cells; and paints and coatings.

In some end-use embodiments, nanocomposites can be used in a number of military applications, including, but not limited to: smaller cameras; cheap, small, and more effective weapons; scratch resistant surfaces; stronger, thinner, and cheaper glass; coatings that resist degradation; lighter, faster aircraft which use less fuel; submarines and planes that can go undetected by radar; and next generation tiny fighter jets/surveillance.

In some end-use embodiments, nanocomposites can be used for improved food packaging. Inorganic nanoparticles incorporated into polymers can produce nanocomposite films with better characteristics as food packaging. The ability of nanomaterials is influenced by elements such as nanoparticle form, size, concentration, surface charge, metal ion release, and the type of surrounding media.

In some end-use embodiments, nanocomposites can be used for improved recycling of plastics packaging. Inorganic nanoparticles used in recycling of polymers can aid in producing improved blends of polymer recyclate ad virgin polymers that allow use of increased amounts of recycled polymer while maintaining desirable polymer properties.

Nanocomposites may also be used in production of lightweight sensors. A polymer-nanotube nanocomposite conducts electricity more efficiently with proper spacing of the nanotubes, such that patches of polymer-nanotube nanocomposite can act as stress sensors on windmill blades or aircraft components.

Any of these end-use applications may be further improved with covalent and/or ionic bonding between a polymer matrix and a dispersed nano-filler as disclosed herein.

In some embodiments, a coated surface of a monolithic article includes nonlimiting examples such as coating on a boat hull, coting on components of a drilling rig, or coating of aluminum sheeting.

Any of these end-use applications may be further improved with covalent or ionic bonding between a polymer coating and a monolithic substrate as disclosed herein.

Method of Manufacture

Preparation of a Second Reactive Substrate

In one embodiment, a second reactive substrate is prepared as follows.

An inorganic substrate is prepared by heating under inert conditions to remove adventitious water.

A first reactive substrate is then prepared under inert conditions at a temperature of 15° C. to 35° C. by reacting the inorganic substrate with a primary coupling agent, comprising a Group 13 element.

A second reactive substrate is then produced by reacting the inorganic substrate, the first reactive substrate, or a combination thereof, with a secondary coupling agent under inert conditions at a temperature of −10° C. to 230° C. in a mixer or extruder, optionally assisted with solvent or diluent. The second reactive substrate has a surface comprising the unreacted functional groups of the secondary coupling agent and stable for storage at normal humidity. That is to say, that inert conditions are not required for handling the second reactive substrate.

Preparation of a First Combination Product

In one embodiment, a first combination product is prepared as follows.

An inorganic substrate is prepared by heating under inert conditions to remove adventitious water.

A first reactive substrate is then prepared under inert conditions at a temperature of −10 to 50° C. (these are exceptionally reactive and the diluents or the reagents themselves can have significant vapor pressure) by reacting the inorganic substrate with a primary coupling agent, comprising a Group 13 element; the Group 13 coupling agent might be delivered in an inert hydrocarbon diluent such as hexanes or Isopar (see for example MAO and MMAO which are typically delivered in toluene; sigma (available from Sigma Aldrich as TNOAL 25 wt % in hexanes; TEAL 1.0 M in hexanes).

A first combination product is then produced by reacting the first reactive substrate (optionally with inert hydrocarbon diluent) with a functionalized polymer under inert conditions at a temperature of −15° C. to 230° C. The first combination product has the functionalized polymer covalently or ionically bonded to the first reactive substrate, the second reactive substrate, or a combination thereof. The first combination product stable for storage at normal humidity. That is to say, that inert conditions are not required for handling the first combination product.

Preparation of a Second Combination Product

In one embodiment, a second combination product is prepared as follows.

A second combination product is produced by reacting the second reactive substrate prepared above, with a functionalized polymer.

Certain Embodiments

In some aspects, a first reactive substrate composition comprises the reaction product of an inorganic substrate and a primary coupling agent. The surface of the inorganic substrate comprises a concentration of hydroxyl groups, a concentration of µ-bonded oxygen groups, or a combination thereof. The primary coupling agent comprises a Group 13 element and reacts with at least a portion of the hydroxyl groups and/or p bonded oxygen groups to covalently or ionically bond the reacted primary coupling agent to the inorganic substrate. The modified substrate composition has a surface comprising a concentration of reacted primary coupling agent.

In some embodiments, in addition to the foregoing aspects, the first reactive substrate composition is further characterized by the primary coupling agent selected from a Group 13 element-based coupling agent represented by Formula I, an alumoxane compound, or a combination thereof. Formula I is:

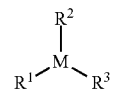

Formula I wherein:

M represents a Group 13 element, or aluminum; and $R^1$, $R^2$, and $R^3$ each independently represent hydrogen, a halogen, or a linear or branched hydrocarbyl having up to 20 carbons and optionally comprising one or more cyclic and/or aromatic structures and/or one or more hetero atoms, and comprise no olefinic unsaturation; or each independently represent a linear or branched alkyl group having up to 12 carbons, and comprise no olefinic unsaturation.

In some embodiments, in addition to the foregoing aspects, the first reactive substrate composition is further characterized by one or more of the following:

a) the inorganic substrate having a surface comprising hydroxyl groups in a concentration of greater than or equal to 0.2 hydroxyls/100 Å$^2$, greater than or equal to 1.0 hydroxyls/100 Å$^2$, greater than or equal to 2.0 hydroxyls/100 Å$^2$, or greater than or equal to 3.0 hydroxyls/100 Å$^2$; or in the range of from 1.0 hydroxyls/100 Å$^2$ to 4.0 hydroxyls/100 Å$^2$, from 1.5 hydroxyls/100 Å$^2$ to 3.8 hydroxyls/100 Å$^2$, from 2.0 hydroxyls/100 Å$^2$ to 3.6 hydroxyls/100 Å$^2$, or from 2.5 hydroxyls/100 Å$^2$ to 3.4 hydroxyls/100 Å$^2$;

b) the inorganic substrate believed to have a surface comprising µ-bonded oxygen groups in a concentration of greater than or equal to 0.1 µ-oxo groups/100 Å$^2$, greater than or equal to 0.5 µ-oxo groups/100 Å$^2$, greater than or equal to 1.0 µ-oxo groups/100 Å$^2$, or greater than or equal to 1.5 µ-oxo groups/100 Å$^2$; or in the range of from 0.5 µ-oxo groups/100 Å$^2$ to 2.0 µ-oxo groups/100 Å$^2$, from 0.75 µ-oxo groups/100 Å$^2$ to 1.9 µ-oxo groups/100 Å$^2$, from 1.0 µ-oxo groups/100 Å$^2$ to 1.8 µ-oxo groups/100 Å$^2$, or from 1.25 µ-oxo groups/100 Å$^2$ to 2.0 µ-oxo groups/100 Å$^2$;

c) the inorganic substrate having a hardness, as measured by Young's modulus, of greater than or equal to 1.0 GPa, greater than or equal to 5.0 GPa, greater than or equal to 50 GPa, greater than or equal to 100 GPa, greater than or equal to 250 GPa, or greater than or equal to 500 GPa; or in the range of from to 2.0 GPa to 3.0 TPa, from to 10 GPa to 2.9 TPa, from to 25 GPa to 2.8 TPa, from to 50 GPa to 2.7 TPa, from to 75 GPa to 2.6 TPa, or from to 100 GPa to 2.5 TPa.

d) at least 50% of the concentration of hydroxyl groups, at least 50% of the concentration of µ-bonded oxygen groups, or a combination thereof, are reacted with the Group 13 element-based coupling agent; and e) the hydroxyl groups, the µ-bonded oxygen groups, or a combination thereof, are reacted with the Group 13 element-based coupling agent to form a monolayer of the reacted Group 13 element-based coupling agent on the surface of the inorganic substrate.

In some aspects, a first reactive filler comprises a calcined aluminum oxide nanoparticle composition and/or the first reactive substrate composition, as described above. The inorganic substrate comprises a member selected from the list consisting of:

a) a spherical filler;
b) a needle filler;
c) a fiber filler;
d) a platelet filler; and
e) a combination thereof.

In some embodiments, in addition to the foregoing aspects, the first reactive filler is further characterized by the spherical filler comprising silica, titania, alumina, graphite, graphene, clay, or a combination thereof.

In some aspects, a first composite material comprises the reaction product of the first reactive filler, as described above, and a functionalized polymer. The functionalized polymer comprises one or more functional groups capable of forming a covalent or ionic bond with the reacted Group 13 element-based coupling agent. In further embodiments, the first composite material is further characterized by one or more of the following:

a) the functionalized polymer comprising one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines;

b) the one or more functional groups having a nucleophilicity parameter of greater than or equal to 0; and c) the functionalized polymer has a molecular weight ranging from oligomers of two mer units, wherein the two mer units can be the same or different, to a weight average molecular weight of 1M g/mol.

In some aspects, an article has at least one surface comprising a calcined aluminum oxide composition and/or the first reactive substrate, as described above. A first coating is formed on the at least one surface by the reaction product of the at least one surface and a functionalized polymer, comprising one or more functional groups capable of forming a covalent or ionic bond with the reacted Group 13 element-based coupling agent and/or the calcined aluminum oxide composition. In further embodiments, the article is further characterized by one or more of the following:

a) the functionalized polymer comprises one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines;

b) the one or more functional groups have a nucleophilicity parameter of greater than or equal to 0; and c) the functionalized polymer has a molecular weight ranging from oligomers of two mer units, wherein the two mer units can be the same or different, to a weight average molecular weight of 1M g/mol.

In some aspects, a second reactive substrate composition comprises a base composition and a portion of a secondary coupling agent having at least two functional groups. The base composition comprises the first reactive substrate, as described above, a calcined aluminum oxide composition, or a combination thereof. At least one functional group of the secondary coupling agent reacts to form a covalent or ionic bond with the base composition, and the second reactive substrate composition has a surface comprising at least one other functional group of the reacted secondary coupling agent, wherein the at least one other functional group remains unreacted. In further embodiments, the second reactive substrate composition is further characterized by one or more of the following:

a) the secondary coupling agent comprises two or more functional groups selected from the group consisting of a primary, secondary, or tertiary amine, a hydroxyl or alcohol, a sulfide, a phosphine, or a combination thereof, and in some embodiments, the two or more functional groups comprise amines.

b) the surface of the second reactive substrate comprises a concentration of the at least one other functional group of the secondary coupling agent that remains unreacted;

c) the at least one other functional group comprises one or more members selected from the group consisting of an amine, a hydroxyl or alcohol, a sulfide, a phosphine, or a combination thereof; and d) the two or more functional groups have a nucleophilicity parameter of greater than or equal to 0.

In some aspects, a second reactive filler comprises the second reactive substrate composition, as described above, wherein the inorganic substrate comprises a member selected from the list consisting of:

a) a spherical filler;
b) a needle filler;
c) a fiber filler;
d) a platelet filler; and
e) a combination thereof.

In some embodiments, the spherical filler comprises silica, titania, alumina, graphite, graphene, clay, or a combination thereof.

In some aspects, a second composite material comprises the reaction product of the second reactive filler and a functionalized polymer. The functionalized polymer comprises one or more functional groups capable of forming a covalent or ionic bond with the at least one other functional group that remains unreacted on the surface of the second reactive substrate. In further embodiments, the first composite material is further characterized by one or more of the following:

a) the functionalized polymer comprises one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines;
b) the one or more functional groups have a nucleophilicity parameter of greater than or equal to 0; and
c) the functionalized polymer has a molecular weight ranging from oligomers of two mer units, wherein the two mer units can be the same or different, to a weight average molecular weight of 1M g/mol.

In some aspects, an article has at least one surface comprising the second reactive substrate, as described above. A second coating is formed on the at least one surface by the reaction product of the at least one surface and a functionalized polymer, comprising one or more functional groups capable of forming a covalent or ionic bond with the at least one other functional group that remains unreacted on the surface of the second reactive substrate. In further embodiments, the article is further characterized by one or more of the following:
a) the functionalized polymer comprising one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines;
b) the one or more functional groups having a nucleophilicity parameter of greater than or equal to 0; and
c) the functionalized polymer has a molecular weight ranging from oligomers of two mer units, wherein the two mer units can be the same or different, to a weight average molecular weight of 1M g/mol.

In some aspects, a method comprises:
a) heating an inorganic substrate to 200° C., 300° C., 400° C., 500° C., 600° C., 700° C., or 800° C. under inert conditions wherein in some embodiments the water content is reduced to less than or equal to 5 ppm (chemisorbed or adsorbed);
b) preparing a first reactive substrate by reacting, under inert conditions, the inorganic substrate with a primary coupling agent, comprising a Group 13 element under reaction conditions sufficient to form a covalent and/or ionic bond, wherein in some embodiments the reaction conditions comprise one or more of:
  i. a temperature in the range of from −10° C. to 90° C., from 0° C. to 80° C., or from 20° C. to 60° C.;
  ii. a pressure in the range of from 50 kPa to 500 kPa, from 100 kPa to 400 kPa, or from 150 kPa to 250 kPa; and
  iii. a time in the range of from 3 minutes to 6 hours, from 10 minutes to 4 hours, or from 15 minutes to 2 hours;
c) preparing a hydrolyzed reactive substrate by hydrolyzing at least a portion of the first reactive substrate; and
d) reacting the inorganic substrate, the first reactive substrate, the hydrolyzed reactive substrate, or a combination thereof with:
  i. a secondary coupling agent to produce a second reactive substrate having a surface comprising functional groups; or
    wherein the reaction (i) is carried out under conditions sufficient to form a covalent and/or ionic bond, wherein in some embodiments the reaction conditions comprise one or more of:
      a. a temperature in the range of from 0° C. to 200° C., from 20° C. to 180° C., or from 40° C. to 160° C. (temperature may be controlled with a diluent as is known in the art);
      b. a pressure in the range of from 50 kPa to 500 kPa, from 100 kPa to 400 kPa, or from 150 kPa to 300 kPa; and
      c. a time in the range of from 15 minutes to 6 hours, from 30 minutes to 5 hours, or from 1 hour to 4 hours.
  ii. one or more functionalized polymers to form a first combination product, wherein the functionalized polymer is covalently or ionically bonded to the inorganic substrate, the first reactive substrate, the hydrolyzed reactive substrate, or a combination thereof;
    wherein the reaction (ii) is carried out in a mechanical mixer or extruder under high shear to insure uniformity of content and further under conditions sufficient to form a covalent and/or ionic bond, wherein in some embodiments the reaction conditions comprise one or more of: mechanical mixer extruder under high shear to insure uniformity of content
      a. a temperature in the range of from 50° C. to 230° C., from 70° C. to 210° C., or from 100° C. to 200° C.;
      b. a pressure in the range of from 100 kPa to 300 kPa, from 100 kPa to 250 kPa, or from 100 kPa to 150 kPa; and
      c. a time in the range of from 5 minutes to 50 minutes, from 10 minutes to 40 minutes, or from 20 minutes to 30 minutes.

In further embodiments, the method further comprises reacting the second reactive substrate with a functionalized polymer to form a second combination product, wherein the functionalized polymer is covalently or ionically bonded to the second reactive substrate.

The following examples illustrate the invention; however, those skilled in the art will recognize numerous variations within the spirit of the invention and scope of the claims. To facilitate a better understanding of the present invention, the following examples of embodiments are given. In no way should the following examples be read to limit, or to define, the scope of the invention.

EXAMPLES

The following examples are included to demonstrate some embodiments of the invention. It should be appreciated by those of skill in the art that the techniques disclosed in the examples which follow represent techniques discovered by the inventor to function well in the practice of the invention, and thus can be considered to constitute operable modes for its practice. However, those of skill in the art should, in light of the present disclosure, appreciate that many changes can be made in the specific embodiments which are disclosed and still obtain a like or similar result without departing from the spirit and scope of the invention.

The following examples provide compositions comprising hard substrates, coupling agents, modified substrates, and composite materials as described above. The composite materials, as disclosed herein, have improved mechanical performance through the use of aluminum-based coupling agents.

This section describes experimental methods and analytical techniques which are used in Examples below.

Unless otherwise specified, all manipulations were conducted at 25° C. under an atmosphere of dry nitrogen by way of standard Schlenk techniques or a dry box. Wherever density values for liquids are unknown, the liquids are added by mass via syringe. Coupling agent preparation and application is optionally conducted in silanized glassware.

Test Methods

Surface aluminum to silicon ratio and nitrogen to aluminum ratio are measured by X-ray photoelectron spectroscopy ("XPS") also known as electron spectroscopy for chemical analysis (ESCA). (see Handbook of x-ray and ultraviolet photoelectron spectroscopy, D. Briggs, editor; and resources listed at xps.com). Bulk elemental compositions (eg. nitrogen, aluminum, carbon) are determined by standard elemental analyses (Galbraith Laboratories, Inc.)

BET surface area is measured according to ASTM D1993-18.

Density (g/cm$^3$): Density measurements were made following ISO 1183-1.

OH concentration on particulates can be measured by methyl-Mg iodide with methane gas release.

Concentration of surface μ-oxo groups, for the purposes of this invention, are deduced as follows. Herein μ-oxo groups are defined to be those created from dehydration of a fully hydroxylated surface. Thus, for example, a fully hydroxylated silica surface is comprised of ~4 Si—OH groups per nm$^2$ (or per 100 Angstroms) and by this definition the surface possesses zero μ-oxo groups. The surface can be dehydroxylated where the products of dehydroxylation are water and a Si—O—Si (or μ-oxo) bond. For a fully dehydroxylated surface, then, the [Si—O—Si]concentration is 2 per nm$^2$. Partial dehydration will lead to [Si—OH] of greater than zero but less than 4. Correspondingly the μ-oxo concentration is <:2 and >0

Particle size distribution is measured according to ASTM D6913/6913M.

Pore volume is measured according to D4365-19.

Porosity and pore size distribution are measured according to ASTM D4284.

Young's modulus is measured according to ASTM El 11.

Raw Materials

Raw materials used herein are shown in Table 1, below.

Sample Preparation Equipment
Reactive Substrates

Example 1

A tared oven-dried 20-mL glass vial equipped with a PTFE-coated magnetic stir bar is transferred into a dry box where it is charged with fumed silica (1.000 g, prepared with the 600° C. thermal treatment to exhibit a hydroxyl group density of 0.50 mmol/g) which is then slurried in toluene (5 mL). TEAL (0.50 mmol), used either neat (0.057 g, 0.068 mL) or as a 25 wt % solution in toluene (0.228 g, 0.269 mL), is then added dropwise by syringe at ambient temperature with stirring (CAUTION: a non-trivial amount (0.5 mmol, ca. 12 mL) of ethane gas is generated here). Following completion of the addition, the slurry is stirred for an additional 3 minutes. This product is denoted as "fS600-TEAL=" and used without further purification (i.e., as a toluene slurry) in subsequent manipulations unless otherwise specified.

Example 2

A tared oven-dried 20-mL glass vial equipped with a PTFE-coated magnetic stir bar is transferred into a dry box where it is charged with fumed silica (1.000 g, prepared with the 200° C. thermal treatment to exhibit a hydroxyl group density of 2.0 mmol/g) which is then slurried in toluene (5 mL). TEAL (2.0 mmol), used either neat (0.228 g, 0.273 mL) or as a 25 wt % solution in toluene (0.913 g, 1.077 mL), is then added dropwise by syringe at ambient temperature with stirring (CAUTION: a non-trivial amount (2.0 mmol, ca. 48 mL) of ethane gas is generated here). Following completion of the addition, the slurry is stirred for an additional 3 minutes. This product is denoted as "fS200-TEAL=" and used without further purification (i.e., as a toluene slurry) in subsequent manipulations unless otherwise specified.

Example 3

A tared oven-dried 20-mL glass vial equipped with a PTFE-coated magnetic stir bar is transferred into a dry box where it is charged with fumed silica (1.000 g, prepared with the 400° C. thermal treatment to exhibit a hydroxyl group density of 1.0 mmol/g) which is then slurried in toluene (5 mL). TEAL (1.0 mmol), used either neat (0.114 g, 0.137

TABLE 1 **

| Label | Composition | Form | mol/L at 25° C. | Available from |
|---|---|---|---|---|
| TEAL | Triethylaluminum | Neat | 7.31 | Sigma-Aldrich |
| TEAL | Triethylaluminum | 25 wt % in toluene | 1.86 | Sigma-Aldrich |
| TEAL | Triethylaluminum | 1.0M in n-heptane | 1.0 | Sigma-Aldrich |
| TMA | Trimethylaluminum | Neat | 10.4 | Sigma-Aldrich |
| TMA | Trimethylaluminum | 2.0M in toluene | 2.0 | Sigma-Aldrich |
| TIBAL | Triisobutylaluminum | 25 wt % in toluene | 1.07 | Sigma-Aldrich |
| DIBAL | Diisobutylaluminum hydride | 25 wt % in toluene | 10.4 | Sigma-Aldrich |
| TNHAL | Trihexylaluminum | Neat | 2.91* | Nouryon |
| TNOAL | Trioctylaluminum | 25 wt % in toluene | 10.4 | Sigma-Aldrich |
| Et$_2$AlOEt | Diethylaluminum ethoxide | 25 wt % in toluene | 1.66 | Sigma-Aldrich |
| Et$_2$AlCl | Diethylaluminum chloride | 25 wt % in toluene | 1.84 | Sigma-Aldrich |
| EtAlCl$_2$ | Ethylaluminum dichloride | 25 wt % in toluene | 1.83 | Sigma-Aldrich |
| Et$_3$Al$_2$Cl$_3$ | Ethylaluminum sesquichloride | Neat | 2.21 | Sigma-Aldrich |
| MAO | Methylaluminoxane | 10 wt % in toluene | 1.54 | Sigma-Aldrich |

*Value is for 35° C. rather than 25° C.
** note the frequent use of diluent for handling; useful especially for small scale reactions in lab environment where solvent waste is generally not an issue mL) or as a 25 wt % solution in toluene (0.457 g, 0.538 mL), is then added dropwise by syringe at ambient temperature with stirring (CAUTION: a non-trivial amount (1.0 mmol, ca. 24 mL) of ethane gas is generated here). Following completion of the addition, the slurry is stirred for an additional 3 minutes. This product is denoted as "fS400-TEAL=" and used without further purification (i.e., as a toluene slurry) in subsequent manipulations unless otherwise specified.

Example 4

A tared oven-dried 20-mL glass vial equipped with a PTFE-coated magnetic stir bar is transferred into a dry box where it is charged with fumed silica (1.000 g, prepared with the 700° C. thermal treatment to exhibit a hydroxyl group density of 0.25 mmol/g) which is then slurried in toluene (5 mL). TEAL (0.25 mmol), used either neat (0.029 g, 0.034 mL) or as a 25 wt % solution in toluene (0.114 g, 0.135 mL), is then added dropwise by syringe at ambient temperature with stirring (CAUTION: a non-trivial amount (0.25 mmol, ca. 6 mL) of ethane gas is generated here). Following completion of the addition, the slurry is stirred for an additional 3 minutes. This product is denoted as "fS700-TEAL=" and used without further purification (i.e., as a toluene slurry) in subsequent manipulations unless otherwise specified.

Functionalized Reactive Substrates

Example 5

To a stirred slurry of fS600-TEAL= in ca. 5 mL toluene (freshly prepared as described above from 1.000 g fumed silica exhibiting a hydroxyl group density of 0.50 mmol/g) at ambient temperature is added dropwise Jeffamine ED 600 (0.5 mmol, 0.300 g, 290 mL, 1 equiv relative to the theoretical amount of reactive coupling sites present on fS600-TEAL=). Following completion of the addition, the slurry is stirred for an additional 5 minutes. The magnetic stir bar is rinsed with toluene as it is removed by an external magnet. The mixture is allowed to settle, and then the majority of supernatant liquid is carefully removed by syringe. The solid is subsequently resuspended in and separated from two toluene rinses and an Isopar E rinse. The remaining solvent is removed under vacuum, and the product is obtained as a solid (1.327 g). This product is denoted as "fS600-TEAL=PA" and should be a stable solid suitable for storage for later use in melt reactions in an appropriate mechanical mixer or mixing extruder.

Example 6

To a stirred slurry of fS600-TEAL= in ca. 5 mL toluene (freshly prepared as described above from 1.000 g fumed silica exhibiting a hydroxyl group density of 0.50 mmol/g is added p-phenylenediamine (0.5 mmol, 0.032 g, delivered as a finely ground powder, 1 equiv relative to the theoretical amount of reactive coupling sites present on fS600-TEAL=). The slurry temperature is raised to 100° C. with a sand bath and stirred is continued for an additional 30 minutes. The slurry is then vacuum filtered with a fritted glass funnel followed by rinsing thoroughly with hot toluene and then Isopar E. The resulting solid is transferred to a tared 20-mL glass vial and placed under vacuum to remove residual solvent. The product is obtained as a solid (1.070 g) and is denoted as "fS600-TEAL=PPDA".

Composite Materials

Example 7

Maleated ethylene-propylene rubber, EPR-MA (Exxelor 1803, 0.8 wt % maleic anhydride, 7.355 g, 0.6 mmol anhydride moieties, 1.2 equiv anhydride moieties relative to the theoretical amount of reactive amine sites on fS600-TEAL=PA), is dissolved in toluene (10 mL) with stirring at 85° C. (maintained via sand bath) in a tared 50-mL glass round bottom flask equipped with a PTFE-coated magnetic stir bar or mechanical stirrer in a dry box. To this stirred solution is added portionwise by spatula fS600-TEAL=PA (prepared as described above from the quantity of fS600-TEAL= obtained from 1.000 g fumed silica exhibiting a hydroxyl group density of 0.50 mmol/g). Following completion of the addition, the mixture is stirred at 85° C. for an additional 5 minutes before allowing to cool to ambient temperature. The mixing blade or stir bar is removed by magnet with rinsing and solvent is removed by vacuum to afford the product (7.440 g). This product is designated as "fS600-TEAL=PA-EPR-MA" and is likely to be quite sticky.

Example 8

Maleated Vistamaxx™ 6102 (1 wt % maleic anhydride, 4.903 g, 0.5 mmol anhydride moieties, 1 equiv anhydride moieties relative to the theoretical amount of reactive amine sites on fS600-TEAL=PA) is dissolved in toluene (10 mL) with stirring at 85° C. (maintained via sand bath) in a 50-mL glass round bottom flask equipped with a mechanical mixer or PTFE-coated magnetic stir bar in a dry box. (Vistamaxx™ 6102, available from ExxonMobil Chemical Company, Houston, TX) This solution is then added dropwise by syringe to a slurry of fS600-TEAL=PA (prepared as described above from the quantity of fS600-TEAL= obtained from 1.000 g fumed silica exhibiting a hydroxyl group density of 0.50 mmol/g) in toluene (10 mL) under stirring at 85° C. (maintained via sand bath) in a tared 50 mL glass round bottom flask equipped with a mechanical stirrer or PTFE-coated magnetic stir bar. The transfer is completed with a hot toluene rinse, and the mixture is stirred at 85° C. for an additional 5 minutes before allowing to cool to ambient temperature. The mechanical mixer blade or stir bar is removed by magnet with rinsing and solvent is removed by vacuum to afford the product (6.215 g). This product is designated as "fS600-TEAL=PA-Vistamaxx-MA".

Example 9

Maleated isotactic polypropylene (Admer, 1 wt % maleic anhydride, 3.922 g, 0.4 mmol anhydride moieties, 0.8 equiv anhydride moieties relative to the theoretical amount of reactive amine sites on fS600-TEAL=PA) is dissolved in toluene (10 mL) with stirring at 105° C. (maintained via sand bath) in a 50-mL glass round bottom flask equipped with a mechanical mixer or PTFE-coated magnetic stir bar in a dry box. This solution is then added dropwise by syringe to a slurry of fS600-TEAL=PA (prepared as described above from the quantity of fS600-TEAL= obtained from 1.000 g fumed silica exhibiting a hydroxyl group density of 0.50 mmol/g) in toluene (5 mL) under stirring at 100° C. (maintained via sand bath) in a 50 mL glass round bottom flask equipped with a mechanical mixer or PTFE-coated magnetic stir bar. The transfer is completed with a hot toluene rinse, and the solution is stirred at 105° C. for an additional 5 minutes before allowing to cool to ambient temperature. The precipitated product is then isolated by filtration and dried in vacuo; a product mass of (5.242 g) is obtained. This product is designated as "fS600-TEAL=PA-Admer-MA".

Example 10

In a dry box, a tared oven-dried 20-mL vial equipped with a PTFE-coated magnetic stir bar is charged with Davison 948 spray-dried silica (1.000 g, 1.6 cm$^3$/g pore volume, supplied by Davison Chemical Division of W. R. Grace and Company and previously subjected to 600° C. thermal treatment to afford an approximate hydroxyl group surface density of 1.6 mmol/g). Prior to the initiation of stirring, a 1.6 mL volume of 1.0 M TEAL in heptanes (supplied by Sigma-Aldrich) is added rapidly by syringe. Following the addition, stirring is initiated and the mixture is allowed to stir at ambient temperature for 5 minutes. The magnetic stir bar is removed by action of an external magnet, rinsing with n-heptane during removal. The solvent is then removed by vacuum to afford 1.134 g of solid.

In a dry box, an atactic polypropylene polymer terminated with secondary cyclohexylamine (AT3000HNMeCy, 0.498 g, 0.1 equiv relative to the theoretical reactive site loading of the modified silica substrate) is placed in a 20-mL Erlenmeyer flask equipped with a PTFE-coated magnetic stir bar. The flask is allowed to warm in a 85° C. sand bath, and then heated toluene (1.4 mL, drawn from a 5 mL portion in a separate flask in the same sand bath) is added to the polymer which is then stirred until dissolved. The vial of modified silica substrate from the previous paragraph is re-equipped with a stir bar but is not stirred. The polymer solution is rapidly added to the modified silica substrate followed by a rapid 1.0 mL heated toluene rinse of the delivery flask to complete the transfer. The silica mixture is then stirred at ambient temperature for 5 minutes. The magnetic stir bar is removed by action of an external magnet and is rinsed with toluene during removal. The solvent is then removed by vacuum to afford 1.1628 g of solid.

Although the present invention and its advantages have been described in detail, it should be understood that various changes, substitutions and alterations can be made herein without departing from the spirit and scope of the invention as defined by the appended claims.

For the sake of brevity, only certain ranges are explicitly disclosed herein. However, in addition to recited ranges, any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All patents, test procedures, and other documents cited in this application are fully incorporated herein by reference for all jurisdictions in which such incorporation is permitted. Moreover, the scope of the present application is not intended to be limited to the particular embodiments of the processes, machines, film structures, composition of layers, means, methods, and/or steps described in the specification. As one of the ordinary skill in the art will readily appreciate from the disclosure of the present invention, processes, machines, film structures, composition of layers, means, methods, and/or steps, presently existing or later to be developed that perform substantially the same function or achieve substantially the same result as the corresponding embodiments described herein, may be utilized according to the present invention. Accordingly, the appended claims are intended to include within their scope such processes, machines, film structures, composition of layers, means, methods, and/or steps.

What is claimed is:

1. A first composite material comprising a reaction product of a first reactive filler and a functionalized polymer, wherein:
   the first reactive filler comprises a first reactive substrate composition comprising a reaction product of:
   a) an inorganic substrate:
      i) having a surface comprising a concentration of hydroxyl groups, a concentration of μ-bonded oxygen groups, or a combination thereof; and
      ii) comprising a water content of less than or equal to 5 ppm; and
   b) a primary coupling agent, comprising a Group 13 element-based coupling agent represented by Formula I, an alumoxane compound, or a combination thereof, wherein:
   Formula I is:

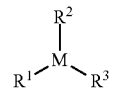

Formula I wherein
   M represents a Group 13 element;
   $R^1$, $R^2$, and $R^3$ each independently represent hydrogen, a halogen, or a linear or branched hydrocarbyl having up to 20 carbons and optionally comprising one or more cyclic and/or aromatic structures and/or one or more hetero atoms, and comprise no olefinic unsaturation;
   the primary coupling agent reacts with at least a portion of the hydroxyl groups and/or μ-bonded oxygen groups to covalently or ionically bond the reacted primary coupling agent to the inorganic substrate; and the first reactive substrate composition has a surface comprising a concentration of reacted primary coupling agent;
   the functionalized polymer comprises one or more functional groups capable of forming a covalent or ionic bond with the reacted Group 13 element-based coupling agent, and has a molecular weight ranging from oligomers of two mer units, wherein the two mer units is the same or different, to a weight average molecular weight of 1M g/mol.

2. The first composite material of claim 1, wherein M is aluminum and $R^1$, $R^2$, and $R^3$ each independently represent a linear or branched alkyl group having up to 12 carbons, and comprise no olefinic unsaturation.

3. The first composite material of claim 1, wherein the inorganic substrate has a hardness, as measured by Young's modulus, of greater than or equal to 1.0 GPa.

4. The first composite material of claim 1, wherein first reactive substrate comprises a monolayer of reacted Group 13 element-based coupling agent on the surface of the inorganic substrate, wherein the monolayer is formed by reaction of the hydroxyl groups, the μ-bonded oxygen groups, or a combination thereof, with the Group 13 element-based coupling agent.

5. The first composite material of claim 1, wherein the inorganic substrate comprises a member selected from the list consisting of a spherical filler, a needle filler, a fiber filler, a platelet filler, and a combination thereof.

6. The first composite material of claim 5, wherein the spherical filler comprises silica, titania, alumina, graphite, graphene, clay, or a combination thereof.

7. The first composite material of claim 1, wherein the functionalized polymer comprises one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines.

8. A second composite material comprising a reaction product of a second reactive filler and a functionalized polymer,
wherein the second reactive filler comprises a second reactive substrate composition comprising a second reaction product of a base composition and a secondary coupling agent having at least two functional groups, wherein the base composition comprises a first reactive substrate composition comprising a reaction product of:
a) an inorganic substrate
  i) having a surface comprising a concentration of hydroxyl groups, a concentration of μ-bonded oxygen groups, or a combination thereof; and
  ii) comprising a water content of less than or equal to 5 ppm; and
b) a primary coupling agent, comprising a Group 13 element-based coupling agent represented by Formula I, an alumoxane compound, or a combination thereof, wherein:
Formula I is:

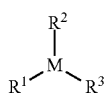

Formula I

M represents a Group 13 element;
$R^1$, $R^2$, and $R^3$ each independently represent hydrogen, a halogen, or a linear or branched hydrocarbyl having up to 20 carbons and optionally comprising one or more cyclic and/or aromatic structures and/or one or more hetero atoms, and comprise no olefinic unsaturation;

the primary coupling agent reacts with at least a portion of the hydroxyl groups and/or μ-bonded oxygen groups to covalently or ionically bond the reacted primary coupling agent to the inorganic substrate; and the first reactive substrate composition has a surface comprising a concentration of reacted primary coupling agent; at least one functional group of the second coupling agent reacts to form a covalent or ionic bond with the base composition; and the second reactive substrate composition has a surface comprising at least one other functional group of the reacted secondary coupling agent; and
wherein the functionalized polymer:
i) comprises one or more functional groups capable of forming a covalent or ionic bond with the at least one of the functional group of the reacted secondary coupling agent on the surface of the second reactive substrate composition; and
ii) has a molecular weight ranging from oligomers of two mer units, wherein the two mer units is the same or different, to a weight average molecular of 1M g/mol.

9. The second composite material of claim 8, wherein the secondary coupling agent comprises two or more functional groups selected from the group consisting of an amine, a hydroxyl or alcohol, a sulfide, a phosphine, or a combination thereof.

10. The second composite material of claim 9, wherein the two or more functional groups consists of amines.

11. The second composite material of claim 8, wherein the surface comprises a concentration of the at least one other functional group.

12. The second composite material of claim 11, wherein the at least one other functional group comprises one or more members selected from the group consisting of an amine, a hydroxyl or alcohol, a hydroxyl or alcohol, a sulfide, a phosphine, or a combination thereof.

13. The second composite material of claim 8, wherein the inorganic substrate comprises a member selected from the list consisting of a spherical filler, a needle filler, a fiber filler, a platelet filler, and a combination thereof.

14. The second composite material of claim 13, wherein the spherical filler comprises silica, titania, alumina, graphite, graphene, clay, or a combination thereof.

15. The second composite material of claim 8, wherein the functionalized polymer comprises one or more functional groups incorporated into the polymer chain, pendant from the polymer along the polymer chain, pendant from the polymer at one or more terminations of the polymer chain, or a combination thereof, wherein such functional groups are one or more members of the group consisting of carboxyl, carboxylic acid, anhydride, sulfhydryl, hydroxyl, alkoxy, carbonyl, epoxide, ketone, dihydrofuran-dione, aldehyde, and primary, secondary, and tertiary amines.

* * * * *